United States Patent
Karshenas Najafabadi et al.

(10) Patent No.: US 9,686,668 B2
(45) Date of Patent: Jun. 20, 2017

(54) METHOD AND APPARATUS FOR INTRA-NETWORK ROAMING FOR IP TELEPHONY NETWORK

(71) Applicant: Vonage America Inc., Holmdel, NJ (US)

(72) Inventors: Soheil Karshenas Najafabadi, Kew Gardens, NY (US); Jaya Meghani, Old Bridge, NJ (US)

(73) Assignee: Vonage America Inc., Holmdel, NJ (US)

( * ) Notice: Subject to any disclaimer, the term of this patent is extended or adjusted under 35 U.S.C. 154(b) by 0 days.

(21) Appl. No.: 14/333,490

(22) Filed: Jul. 16, 2014

(65) Prior Publication Data

US 2015/0350869 A1    Dec. 3, 2015

Related U.S. Application Data

(63) Continuation-in-part of application No. 14/291,566, filed on May 30, 2014.

(51) Int. Cl.
*H04W 4/00* (2009.01)
*H04W 8/02* (2009.01)
(Continued)

(52) U.S. Cl.
CPC ........... *H04W 8/02* (2013.01); *H04L 65/1096* (2013.01); *H04W 60/04* (2013.01); *H04M 7/006* (2013.01); *H04W 8/12* (2013.01)

(58) Field of Classification Search
CPC ......... H04W 8/26; H04W 12/06; H04W 8/06; H04W 4/24; H04W 4/001; H04W 4/003;
(Continued)

(56) References Cited

U.S. PATENT DOCUMENTS 5,745,850 A    4/1998    Aldermeshian et al.
6,088,126 A    7/2000    Khouri et al.
(Continued)

OTHER PUBLICATIONS

International Search Report issued in PCT/US2012/071248 on Oct. 4, 2013.
(Continued)

*Primary Examiner* — Ronald Eisner
(74) *Attorney, Agent, or Firm* — Nixon & Vanderhye P.C.; Joseph Pagnotta

(57) ABSTRACT

A method of operating an internet-based telephony system comprises (1) determining that a telephony device associated with a customer of the internet-based telephony system has access to service of the internet-based telephony system; (2) sending a first location update signal to a public land mobile network associated with the customer; (3) receiving an indication that the public land mobile network associated with the customer no longer considers the internet-based telephony system as being the network visited by the telephony device associated with the customer; (4) determining the telephony device associated with the customer and the internet-based telephony system are in data communication, and (5) sending a second location update signal to the public land mobile network associated with the customer to register again the internet-based telephony system as the network visited by the telephony device associated with the customer.

25 Claims, 26 Drawing Sheets

(51) Int. Cl.
*H04L 29/06* (2006.01)
*H04W 60/04* (2009.01)
*H04M 7/00* (2006.01)
*H04W 8/12* (2009.01)

(58) Field of Classification Search
CPC ......... H04W 8/04; H04W 8/12; H04W 8/183; H04W 60/00; H04W 8/10; H04W 8/18; H04W 48/18; H04W 60/04; H04W 64/00; H04W 8/02
USPC .............................................. 455/432.1–434
See application file for complete search history.

(56) References Cited

U.S. PATENT DOCUMENTS

| | | | |
|---|---|---|---|
| 6,442,386 B1* | 8/2002 | Salin | H04W 76/06 455/432.1 |
| 6,615,037 B1 | 9/2003 | Bharatia et al. | |
| 7,116,975 B1 | 10/2006 | Link et al. | |
| 7,379,436 B2 | 5/2008 | Jiang | |
| 7,551,920 B1 | 6/2009 | Ngan | |
| 7,664,494 B2* | 2/2010 | Jiang | H04W 76/022 455/432.1 |
| 7,885,657 B2 | 2/2011 | Bicker | |
| 7,990,912 B2 | 8/2011 | Nix et al. | |
| 8,139,753 B2 | 3/2012 | Pickering et al. | |
| 8,571,060 B2 | 10/2013 | Fighel | |
| 8,600,364 B2 | 12/2013 | Fighel | |
| 8,693,994 B2 | 4/2014 | Fighel | |
| 8,744,422 B2 | 6/2014 | Fighel | |
| 8,855,612 B2 | 10/2014 | Fighel et al. | |
| 8,862,109 B2 | 10/2014 | Fighel | |
| 8,934,882 B2 | 1/2015 | Fighel et al. | |
| 8,958,785 B2 | 2/2015 | Fighel | |
| 8,989,721 B2 | 3/2015 | Fighel | |
| 9,002,335 B2 | 4/2015 | Fighel | |
| 9,002,336 B2 | 4/2015 | Fighel | |
| 9,020,477 B2 | 4/2015 | Fighel | |
| 9,020,478 B2 | 4/2015 | Fighel | |
| 2001/0040954 A1 | 11/2001 | Brachman et al. | |
| 2003/0003900 A1 | 1/2003 | Goss et al. | |
| 2004/0076140 A1 | 4/2004 | Begeja et al. | |
| 2004/0248563 A1 | 12/2004 | Ayers et al. | |
| 2007/0015536 A1 | 1/2007 | Labauve et al. | |
| 2007/0064682 A1 | 3/2007 | Adams et al. | |
| 2007/0076665 A1 | 4/2007 | Nair | |
| 2007/0121580 A1 | 5/2007 | Forte et al. | |
| 2007/0167167 A1 | 7/2007 | Jiang | |
| 2007/0274485 A1 | 11/2007 | Garrison | |
| 2008/0039080 A1 | 2/2008 | Bertagnole et al. | |
| 2008/0075261 A1 | 3/2008 | Ramanathan et al. | |
| 2008/0153480 A1 | 6/2008 | Jiang | |
| 2008/0244148 A1 | 10/2008 | Nix et al. | |
| 2009/0092093 A1 | 4/2009 | Wu | |
| 2009/0116636 A1 | 5/2009 | Pickering et al. | |
| 2009/0141882 A1 | 6/2009 | Baeza | |
| 2010/0124323 A1 | 5/2010 | Herndon et al. | |
| 2011/0075675 A1* | 3/2011 | Koodli | H04L 12/14 370/401 |
| 2011/0096771 A1 | 4/2011 | Saru et al. | |
| 2012/0202488 A1* | 8/2012 | Yang | H04W 8/26 455/433 |
| 2013/0005308 A1 | 1/2013 | Wouterse | |
| 2013/0059574 A1 | 3/2013 | Fighel et al. | |

OTHER PUBLICATIONS

Written Opinion issued in PCT/US2012/071248 on Oct. 4, 2013.
"3rd Generation Partnership Project; Technical Specification Group Core Network and Terminals; Call Forwarding (CF) supplementary services; Stage 2 (Release 11)", 3GPP Standard; 3GPP TS 23.082, 3rd Generation Partnership Project (3GPP), Mobile Competence Centre; 650, Route Des Lucioles, F-06921 Sophia-Antipolis Cedex; France, vol. CT WG4, No. V11.0.0, Dec. 17, 2011 (Dec. 17, 2011), pp. 1-86, XP050554577, [retrieved on Dec. 17, 2011] paragraphs [0001]-[01.2]; figures 1.1, 1.11.
Anonymous: "Easy Call Forwarding App" Android Forums, Dec. 2, 2010 (Dec. 2, 2010) pp. 1-4, XP055066320, Retrieved from the Internet: URL:http://androidforums.com/android-applications/7380-easy-call-forwarding-app.html [retrieved on Jun. 12, 2013] the whole document.
Rosenberg et al., SIP: Session Initiation Protocol, Internet Engineering Task Force, RFC 3261, Jun. 2002, 269 pages.
Dierks et al., The Transport Layer Security (TLS) Protocol, version 1.2, Network Working Group, RFC 5246, Aug. 2008, 105 pages.
Jonsson et al., Public-Key Cryptography Standards (PKCS) #1: RSA Cryptography Specifications, version 2.1, Network Working Group, RFC 3447, Feb. 2003, 72 pages.
"Advance Encryption Standard" (AES), Federal Information Processing Standards Publication 197, Nov. 26, 2001, 51 pages.
Call Forwarding; Wikipedia, the free encyclopedia; Dec. 11, 2012; pp. 1-5.
How to Forward Calls on the iPhone and any other ATT cell phone—Know Your Cell; Dec. 11, 2012; pp. 1-2.
"3rd Generation Partnership Project; Technical Specification Group Services and System Aspects; Voice Call Continuity (VCC) between Circuit Switched (CS) and IP Multimedia Subsystem (IMS); Stage 2 (Release 7)" 3GPP TS 23.206. 3rd Generation Partnership Project (3GPP). Mobile Competence Centre; 650. Route Des Lucioles; F-06921 Sophia-Antipolis Cedex; France No. V7.5.0. Dec. 1, 2007 (Dec. 1, 2007). pp. 1-36. XP050363131. paragraphs [0005]-[05.2]; figure 5.1 paragraph [6.5.2.3] paragraphs [Annex:A]-[Annex:A.1].
Office Action issued in U.S. Appl. No. 13/334,849 on Mar. 16, 2012.
Office Action issued in U.S. Appl. No. 13/492,361 on Jul. 20, 2012.
Office Action mailed Aug. 11, 2015 in U.S. Appl. No. 13/668,826.
Notice of Allowance mailed Nov. 24, 2015 in U.S. Appl. No. 13/668,826.
Notice of Allowance mailed Jan. 12, 2016 in U.S. Appl. No. 13/668,826.
Office Action mailed Mar. 7, 2016 in U.S. Appl. No. 13/668,826.
Notice of Allowance mailed Jun. 20, 2016 in U.S. Appl. No. 13/668,826.

* cited by examiner

METHOD AND APPARATUS FOR INTRA-NETWORK ROAMING FOR IP TELEPHONY NETWORK

This application is a continuation-in-part of U.S. patent application Ser. No. 14/291,566, filed May 30, 2014, entitled "METHOD AND APPARATUS FOR INTRA-NETWORK ROAMING FOR IP TELEPHONY NETWORK", which is incorporated herein by reference in its entirety.

TECHNICAL FIELD

The technology relates to telecommunications, and in particular to Internet Protocol (IP) telephone systems that are accessible to mobile telephony devices.

BACKGROUND

An Internet Protocol (IP) telephony system routes various types of communications, at least in part, via data packets that are communicated over a data network. The data network is commonly the Internet. The types of communications may be, for example, telephone calls, video calls, text and video messages, and other forms of telephony and data communications. The users of the Internet Protocol (IP) telephony system typically gain access to the Internet using an Internet service provider so that they can communicate via the IP telephony system.

Some users or customers of the IP telephony system may engage in communications using telephony devices that are connected by physical lines such as cables or wires to an access point such as an internet port. Such wired telephony devices may, thanks to the services of the IP telephony system, be moved from one physical location to another physical location, but at each such physical location are physically connected in a wired manner to the respective access point.

Other users or customers of the IP telephony system may possess mobile or wireless telephony devices, such as a wireless terminal, user equipment (UE), mobile phone, smart phone, or laptop, tablet, or other device with mobile termination. When such a mobile telephony device is within coverage of an appropriate wireless network (e.g., WiFi or WiMax network) that has connection to the a data network such as the Internet, the communications involving the mobile telephony device may be handled by the IP telephony system in conjunction with the wireless network. In other words, the communications may occur wirelessly between the mobile telephony device and a wireless access point of the wireless network, with the wireless access point in turn being connected to an Internet portal. Access in this manner to the Internet portal enables the mobile telephony device to capitalize upon the service of the IP telephony system in economically routing the communications through the Internet, rather than over existing non-Internet service carriers.

When a mobile telephony device is not in range of a wireless network to gain the benefit of the IP telephony system, the mobile telephony device may instead be served by other carriers and/or services using one or more mobile radio access networks. Such mobile radio access networks typically comprise plural base stations which have both radio frequency transmitting and receiving capabilities to serve macro cells. A macro cell is essentially defined by the extent of the transmitting and receiving capabilities of the base station. The mobile telephony devices located within the cell may communicate with the radio access network through the base station (unless the customer also happens to be within range of another wireless network, such as a WiFi or WiMax wireless network or the like, and exercises the option to use the other wireless network instead of the radio access network). In some instances such a "macro" base station may be called a "radio base station", "base station", NodeB, eNodeB, or the like.

Many radio access networks allow a mobile telephony device to roam from cell to cell, either within the same radio access network and radio access technology, or even to roam between cells of differing radio access network and/or radio access technologies. Such roaming between macro cells and technologies of radio access networks typically involves an operation or procedure known as "location update", or some similar operation.

Consider, for example, a scenario in which a user of a mobile telephony device, having a home carrier in the United States of America, travels to China with the mobile telephony device. When the mobile telephony device is turned on in China, a switch or other element in a Chinese mobile network detects activation of the mobile telephony device. As a result, the Chinese mobile network sends a location update type message to a home location register (HLR) of the American home carrier. The location update message informs the American home carrier that the mobile telephony device is now within service of the Chinese mobile network, so that the American home carrier should transfer all incoming calls directed to the mobile telephony device to the Chinese mobile network. Thereafter, when a new call is placed to the mobile telephony device (now in China), any such new call, regardless of location of origination, is initially directed to the American home carrier. Upon receipt of the new incoming call to the mobile telephony device the American home carrier checks its home location register and thus determines that the mobile telephony device is now serviced by the Chinese mobile network. Accordingly, the American home carrier sends a message to the Chinese mobile network, asking for a registration number (a temporary telephone number assigned by the Chinese mobile network to the mobile telephony device) recognizable by the Chinese mobile network for the mobile telephony device now serviced in China. Upon receiving from the Chinese mobile network the Chinese-provided registration number for the mobile telephony device, the American carrier transfers the incoming call using the Chinese-provided registration number to the Chinese mobile network. In this manner the Chinese mobile network recognizes the transferred incoming call to the mobile telephony device, and can route the transferred incoming call through the Chinese mobile network to the mobile telephony device.

The location update procedure described above applies to roaming mobile telephony devices that are served by non-IP telephony systems. Both IP telephony systems and non-IP telephony systems both provide an additional service known as call forwarding. In a call forwarding service, incoming calls to a customer's nominal directory number are instead routed to an alternate number specified by the customer. Such alternate number may be stored in a home location register or the like maintained by the home carrier network. The call forwarding service may be available both to wired and wirelessly connected telephony devices. Examples of how call forwarding services may be beneficially used by mobile/wireless telephony devices are described in one or more of the following United States patent applications, all of which are incorporated herein by reference: U.S. Pat. No. 8,600,364; U.S. patent application Ser. Nos. 13/492,361;

13/562,542; 13/568,416; 13/597,396; 13/597,916; 13/668, 826; 13/671,006; 13/673,043; 13/649,847; 13/671,162; 13/597,485; and 13/669,009.

When call forwarding is to be utilized for a mobile telephony device, the customer or subscriber may input a string of numbers, e.g., a code such as "#21*xxx* (wherein "xxx" is the call forwarding number to be used upon implementation of the call forwarding operation). The input of code a code results in a signal being transmitted to the home carrier that informs the home carrier to start forwarding calls to the number specified in the string (or a number pre-stored with the home carrier) instead of the nominal directory number associated with the wireless telephony device.

In some instances the forwarding number may be a number associated with an IP telephony system, e.g., a server of an IP telephony system. Thereafter, the IP-telephony system may terminate the call over the IP telephony system network to the subscriber when the subscriber is in range of an appropriate internet-connected wireless network, such as Wi-Fi. The call forwarding service is thus implemented at the time of conscious, deliberate activation of the customer/subscriber, and remains in effect until the call forwarding service is removed by a similar conscious, deliberate act of the customer/subscriber. In essence, the call forwarding number remains permanently applied until specifically replaced by the customer/subscriber. Thus, prior art call forwarding services do not effectively cater to the roaming of mobile telephony devices.

SUMMARY

In one of its aspects the technology disclosed herein concerns a method of operating an internet-based telephony system. The method comprises (1) determining that a telephony device associated with a customer of the internet-based telephony system has access to service of the internet-based telephony system. The method further comprises (2) sending a first location update signal to a public land mobile network associated with the customer. The first location update signal includes an identification of the internet-based telephony system as a network visited by the telephony device associated with the customer. The method further comprises thereafter (3) receiving an indication that the public land mobile network associated with the customer no longer considers the internet-based telephony system as being the network visited by the telephony device associated with the customer. The method further comprises (4) determining the telephony device associated with the customer and the internet-based telephony system are in data communication, and (5) sending a second location update signal to the public land mobile network associated with the customer to register again the internet-based telephony system as the network visited by the telephony device associated with the customer.

In an example embodiment and mode the indication that the public land mobile network associated with the customer no longer considers the internet-based telephony system as being the network visited by the telephony device associated with the customer comprises a map-cancel-location-request signal.

In an example embodiment and mode when a set of act (3), act (4), and act (5) occurs a predetermined number of times, the method further comprises sending a network contention resolution signal to the telephony device. The network contention resolution signal is configured to either disable macro communication capability of the telephony device or provide a notification to the telephony device.

In an example embodiment and mode the method further comprises determining that the telephony device is not participating in a service provided through a macro radio network, and sending a signal to disable macro communication capability of the telephony device so that the IP telephony system remains as the network visited by the telephony device associated with the customer. In an example implementation, the act of determining that the telephony device is not participating in the service provided through the macro radio network comprises receiving an indication from the telephony device that the telephony device is not participating in the service provided through the macro radio network.

In an example embodiment and mode the method further comprises sending a signal to disable macro communication capability of the telephony device so that the IP telephony system remains as the network visited by the telephony device associated with the customer; and then determining that the telephony device associated with the customer and the internet-based telephony system are no longer in data communication.

In an example embodiment and mode the act of determining that the telephony device associated with the customer and the internet-based telephony system are in data communication comprises determining that a still-alive indication associated with the telephony device exists in a status database. In an example implementation, the method further comprises the internet-based telephony system sending a prompt message to the telephony device and, upon receipt of a response to the prompt message, setting the data connection still-alive indication in the status database.

In an example embodiment and mode act (3), act (4), and act (5) comprise a set of acts that may be repeated for plural iterations, and after act (5) has been performed a maximum number of times the act (4) and the act (5) are not performed for a next iteration.

In an example embodiment and mode the method further comprises, after the internet-based telephony system receives a further indication that the public land mobile network associated with the customer no longer considers the internet-based telephony system as being the network visited by the telephony device associated with the customer, imposing a time delay before again performing act (4) and act (5). In an example implementation the further indication comprises plural further indications received either within a predetermined time period of one another or within a predetermined time period of location update signals previously sent by the Internet Protocol telephony system.

In another of its aspects the technology disclosed herein concerns an internet-based telephony system comprising a processor. In an example embodiment and mode the processor is configured to (1) determine that a telephony device associated with a customer of the internet-based telephony system has access to service of the internet-based telephony system. The processor is further configured to (2) send a first location update signal to a public land mobile network associated with the customer, the first location update signal including an identification of the internet-based telephony system as a network visited by the telephony device associated with the customer. The processor is further configured to (3) receive an indication that the public land mobile network associated with the customer no longer considers the internet-based telephony system as being the network visited by the telephony device associated with the customer. The processor is further configured to (4) determine that the telephony device associated with the customer and the internet-based telephony system are in data communication; and (5) send a second location update signal to the public land mobile network associated with the customer to register again the internet-based telephony system as the network visited by the telephony device associated with the customer.

In an example embodiment and mode the indication that the public land mobile network associated with the customer no longer considers the internet-based telephony system as being the network visited by the telephony device associated with the customer comprises a map-cancel-location-request signal.

In an example embodiment and mode when a set of act (3), act (4), and act (5) occur a predetermined number of times, the processor is configured to send a network contention resolution signal to the telephony device, the network contention resolution signal being configured to either: disable macro communication capability of the telephony device; or provide a notification to the telephony device.

In an example embodiment and mode the processor is further configured to determine that the telephony device is not participating in a service provided through a macro radio network; and send a signal to the telephony device to disable macro communication capability of the telephony device.

In an example embodiment and mode the processor is configured to determine that the telephony device is not participating in the service provided through the macro radio network by receiving an indication from the telephony device that the telephony device is not participating in the service provided through the macro radio network.

In an example embodiment and mode the processor is configured to send a signal to disable macro communication capability of the telephony device so that the IP telephony system remains as the network visited by the telephony device associated with the customer; and then determine that the telephony device associated with the customer and the internet-based telephony system are no longer in data communication.

In an example embodiment and mode the processor is configured to determine whether the telephony device associated with the customer and the internet-based telephony system are in data communication by making a determination that a still-alive indication associated with the telephony device still exists in a status database. In an example implementation the processor is configured to send a prompt message to the telephony device and, upon receipt of a response to the prompt message, to set the data connection still-alive indication in the status database.

In an example embodiment and mode, wherein act (3), act (4), and act (5) comprise a set of acts that may be repeated for plural iterations, and the processor is configured so that after act (5) has been performed a maximum number of times the act (4) and the act (5) are not performed for a next iteration.

In an example embodiment and mode the processor is configured, after the internet-based telephony system receives a further indication that the public land mobile network associated with the customer no longer considers the internet-based telephony system as being the network visited by the telephony device associated with the customer, to impose a time delay before again performing act (4) and act (5). In an example implementation, the further indication comprises plural further indications received either within a predetermined time period of one another or within a predetermined time period of location update signals previously sent by the Internet Protocol telephony system.

In another of its aspects the technology disclosed herein concerns a method of operating a telephony device. The method comprises at least temporarily disabling macro communication capability of the telephony device when the telephony device is in data communication with an IP telephony system; and re-enabling the macro communication capability of the telephony device when the telephony device looses data communication with the IP telephony system. In an example implementation the method may further comprise providing a notification to the user of the telephony device to give the user an option of at least temporarily disabling the macro communication capability of the telephony device when the telephony device is in data communication with the IP telephony system.

Moreover, the technology disclosed herein concerns a telephony device comprising a processor configured to at least temporarily disable macro communication capability of the telephony device when the telephony device is in data communication with an IP telephony system; and re-enable the macro communication capability of the telephony device when the telephony device looses data communication with the IP telephony system.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1A:
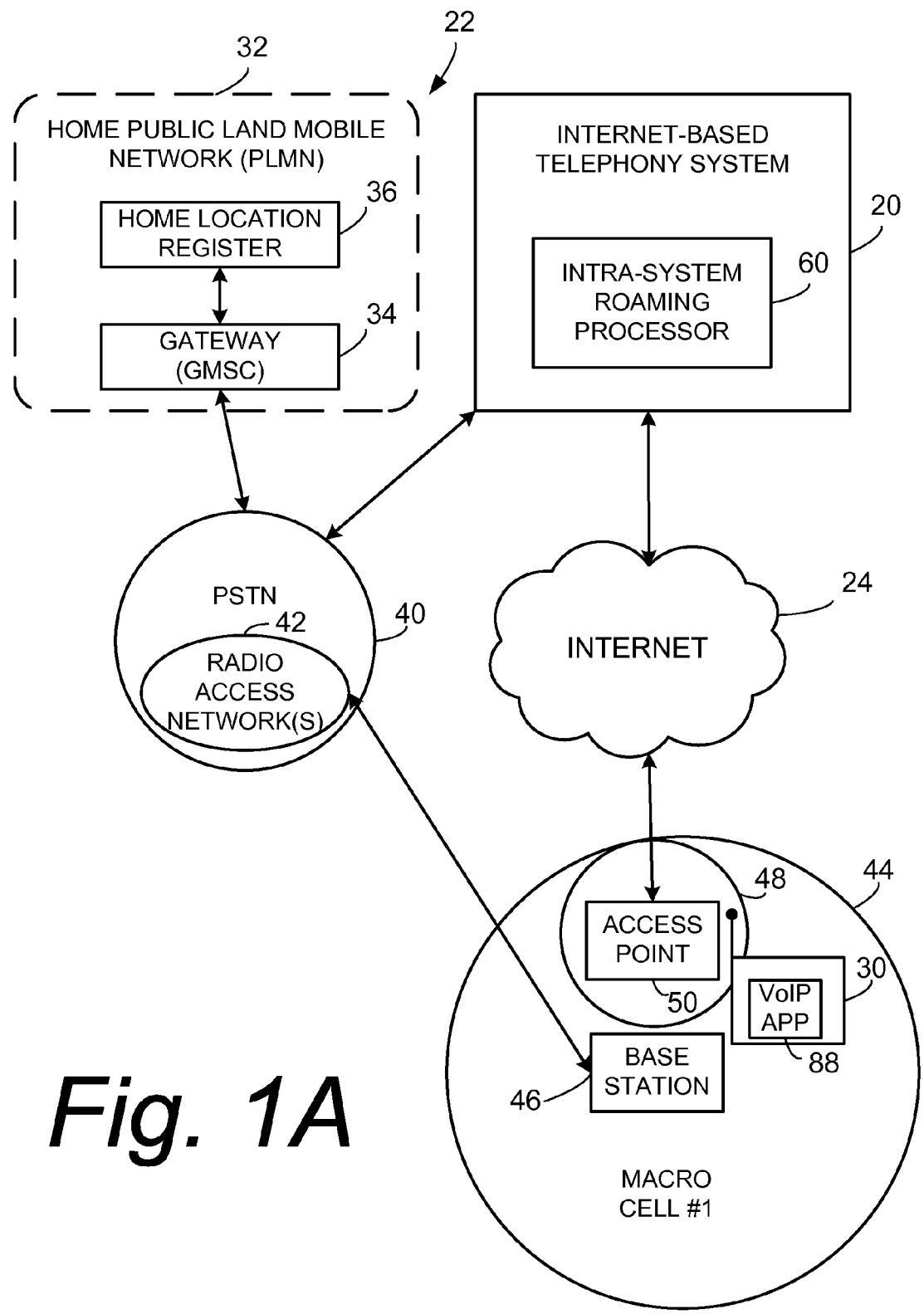
FIG. 1A is a diagrammatic view of a communications network comprising an Internet-based telephony system which facilitates intra-system roaming, showing location/situation of a telephony device in a first roaming position.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

In the following description, the terms "VoIP system", "VoIP telephony system", "IP system" and "IP telephony system" are all intended to refer to a system that connects callers and that delivers data, text and video communications using Internet protocol data communications.

The following description will refer to "telephony communications". The term "telephony communications" is intended to encompass any type of communication that could pass back and forth between users of an IP telephony system. This includes audio and video telephone, text messages such as short message service (SMS) communications, video messages and any other form of telephony or data communication.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™. Such a device may act as a mobile telephony device once it is configured with appropriate application software.

FIG. 1A shows a telephony system 20, in context of an exemplary generic communications system 22. In view of the fact that the telephony system 20 may be an Internet (IP) telephony system, the telephony system 20 is shown as connected to a data communications network such as Internet 24. A telephony device 30, which for sake of illustration happens to be a mobile or wireless telephony device such as a user equipment unit, smart phone, or laptop with mobile termination, for example, is associated with a customer of the telephony system 20.

The customer is not only a customer of telephony system 20, but is also served by the customer's home public land mobile network (PLMN) 32. The customer's home public land mobile network 32 is shown in FIG. 1A as comprising a PLMN gateway or switching center (GMSC) 34, as well as a PLMN home location register (HLR) 36.

Both home public land mobile network 32 and telephony system 20 are connected to the public switched telephone network (PSTN) 40. The public switched telephone network (PSTN) 40 may comprise one or more radio access network(s) (RANs) 42. The home public land mobile network 32 is connected to public switched telephone network (PSTN) 40 through the PLMN gateway 34. Telephony system 20 is also connected to public switched telephone network (PSTN) 40 through its gateway(s), described hereinafter.

FIG. 1A further shows telephony device 30 as being situated in a radio access network cell 44 which is served by base station 46 of a radio access network 42. The base station 46 may be a base station controller (BSC), NodeB, eNodeB, or other type of base station. As such, the network cell 44 may be referred to as a macro cell and the base station 46 as a macro base station. Typically macro base stations such as macro base station 46 communicate with wireless terminals using licensed frequencies.

It will be appreciated that some macro base stations belong to networks which have data connection handling capability while other base stations belong to networks that do not have data connection handling capability. The former networks provide services such as call service and short message service (SMS), and typically include base stations which report to a radio network controller node and which may belong to a roaming area. The former networks additionally provide General Packet Radio Service (GPRS)/3G/LTE services and typically include base stations characterized as NodeB or eNodeB and for which routing areas are defined. The base stations of both types of networks broadcast their roaming and routing area.

FIG. 1A also shows telephony device 30 as being within a smaller cell 48 (e.g., a micro cell, home cell, pico cell, or femto cell) which is served by a wireless access point 50 of an internet-connected wireless access service. The access point 50 may provide Wi-Fi or WiMAX access to telephony device 30. Wi-Fi is a technology that allows an electronic device to exchange data or connect to the Internet wirelessly using microwaves in the 2.4 GHz and 5 GHz bands, and thus includes any "wireless local area network (WLAN) products that are based on the Institute of Electrical and Electronics Engineers' (IEEE) 802.11 standards". The smaller cell 48 may also be referred to as an access point cell. Typically access points such as access point 50 communicate with wireless terminals using unlicensed frequencies.

The telephony system 20 comprises intra-system roaming processor 60. Although phrased as a processor, intra-system roaming processor 60 may comprise one or more processors, controllers, or servers, either co-located or distributed, that facilitate roaming of telephony device 30 within the territory in which the service of internet-based telephony system 20 is available, e.g., available through co-operation of wireless access points. An example of such an Internet-based telephony system 20 is a voice over IP (VoIP) telephony system. However, in view of the fact that the communications encompassed by the technology described herein is not limited to voice communications, the internet-based telephony system 20 may also be referred to as a "Communication over IP", or "CoIP system". The "intra-system" descriptor signifies that the roaming facilitated by processor 60 is roaming within the territory in which the service of internet-based telephony system 20 is available. In that regard, the intra-system roaming processor 60 may also be referred to as "roaming within CoIP system processor" or, more simply, CoIP roaming processor that implements a "CoIP roaming" feature of the technology disclosed herein.

Figure 1B:
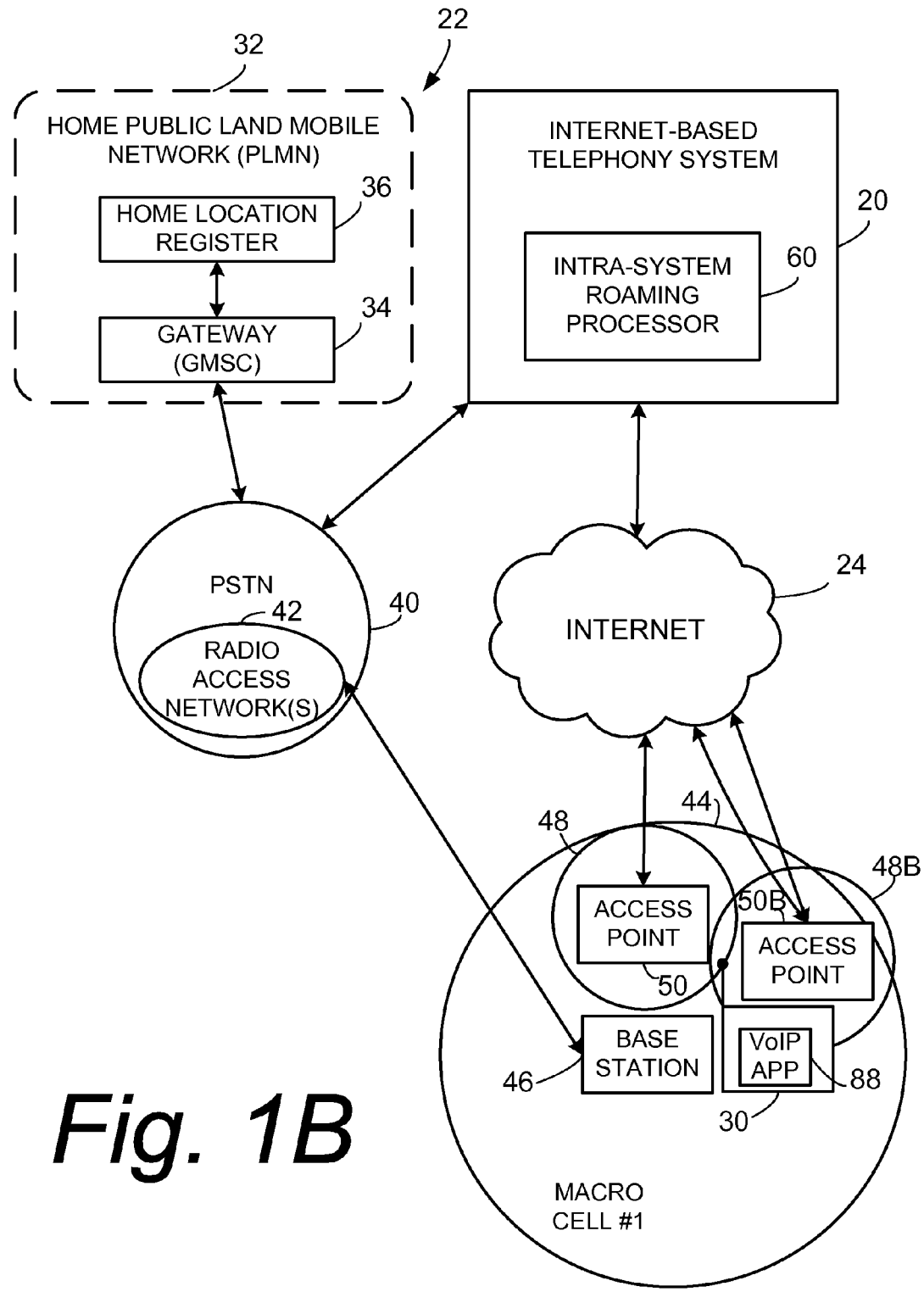
FIG. 1B is a diagrammatic view of the communications network of FIG. 1A, showing further aspects of the network and location/situation of a telephony device in an exemplary second roaming position.
Figure 1C:
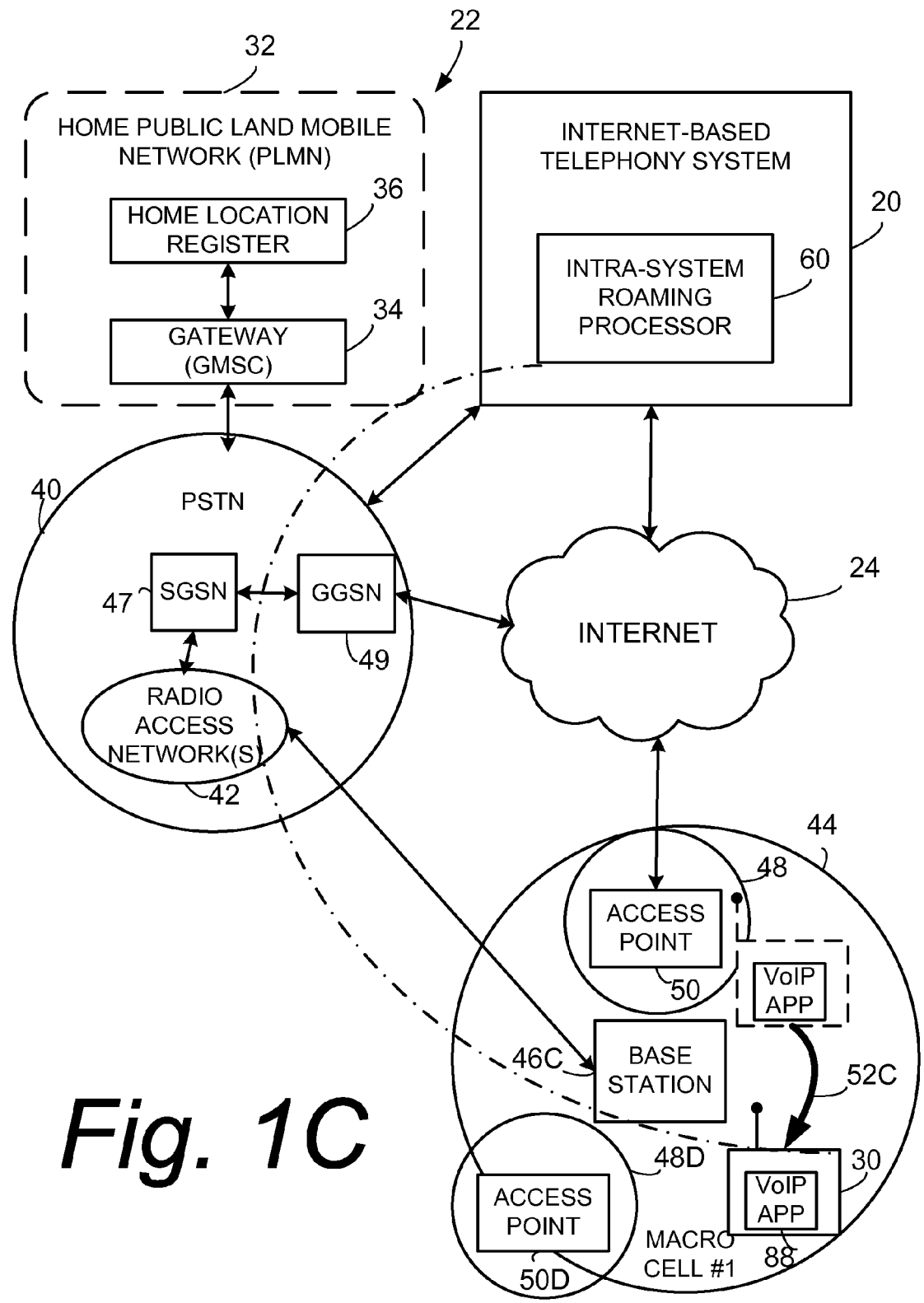
FIG. 1C is a diagrammatic view of the communications network of FIG. 1A, showing further aspects of the network and location/situation of a telephony device in an exemplary third roaming position.
Figure 1D:
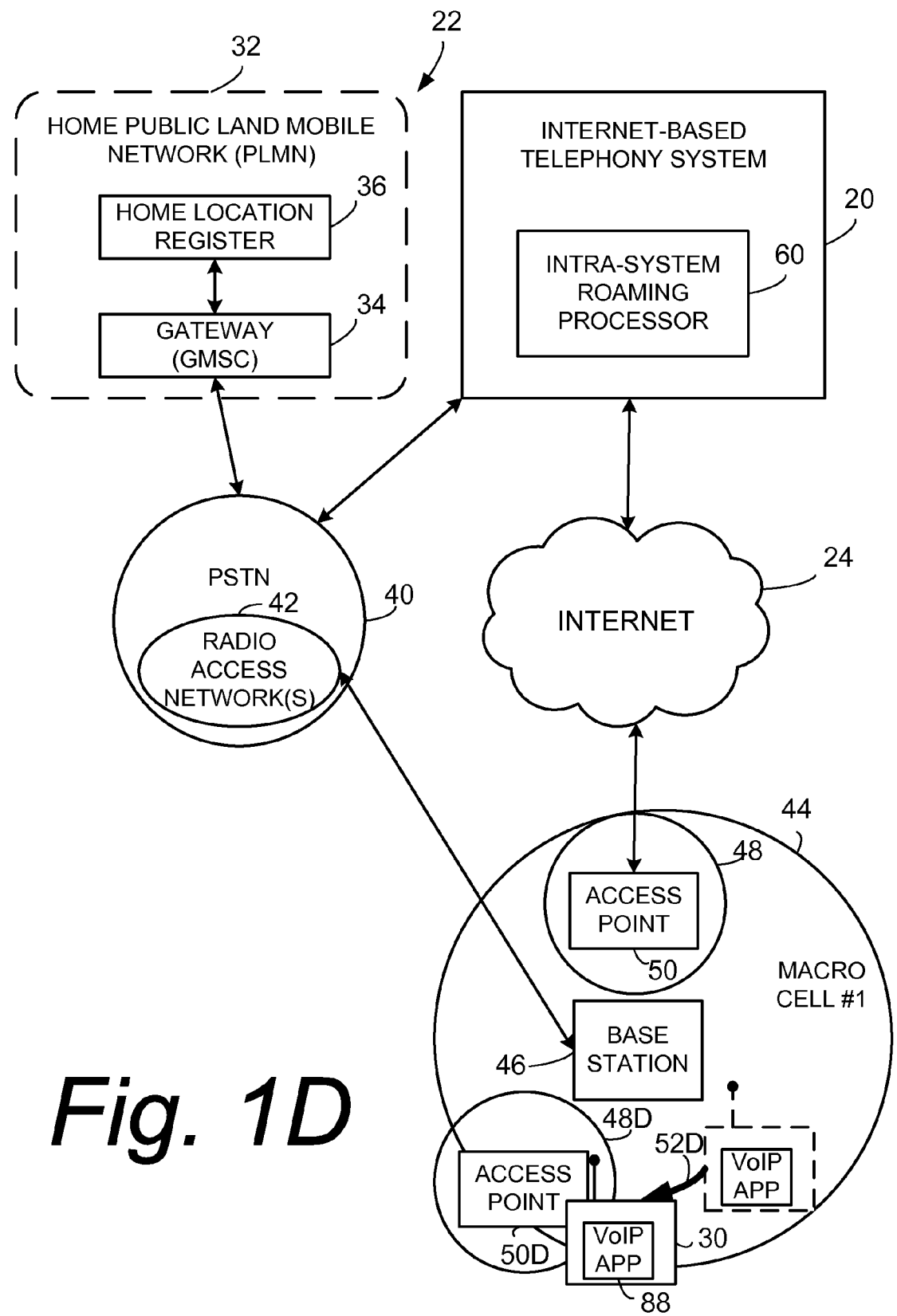
FIG. 1D is a diagrammatic view of the communications network of FIG. 1A, showing further aspects of the network and location/situation of a telephony device in an exemplary fourth roaming position.

Several examples of such intra-system roaming or CoIP roaming are illustrated by comparing FIG. 1A with FIG. 1B, FIG. 1C, and FIG. 1D. FIG. 1B shows a situation in which telephony device 30 has roamed into access point cell 48B of another access point 50B. The cell 48B may also be within the range of macro cell 44, but is situated with respect to original access point cell 48 so that the telephony device 30 may engage in handoff or handover from access point cell 48 to access point cell 48B without having to be served by base station 46, e.g., the telephony device 30 may continually remain within coverage of the access points 50 and 50B and thus stay within "coverage" of internet-based telephony system 20.

FIG. 1C, shows a situation in which telephony device 30 has roamed away from access points such as 50 and 50B (as indicated by roaming direction arrow 52C) and therefore is no longer with in WiFi or WiMax coverage. However, in FIG. 1C the base station 46C is configured to handle data connections, e.g., is a Node-B or eNodeB type base station which has a data connection such as GPRS/3G/LTE. As such, being within coverage of Node-B base station 46C the telephony device 30 is able to make a data connection through the licensed frequencies of the base station 46C over the air interface, through appropriate core network nodes such as Serving GPRS Support Node (SGSN) 47 and GPRS Gateway Support Node (GGSN) 49 to internet 24, and through internet 24 to telephony system 20. Thus, although not using the WiFi or unlicensed frequencies, as shown by the dotted-dashed line in FIG. 1C the telephony device 30 still has access through the data services of the macro cell to telephony system 20, and thus remains "in coverage" in the situation of FIG. 1C.

FIG. 1D shows by roaming direction arrow 52D that telephony device 30 has roamed from the position of FIG. 1C to again be within coverage of another access point, i.e., access point 50D. FIG. 1D shows telephony device 30 also remaining within coverage of telephony system 20, and in particular again gaining WiFi type coverage.

Figure 1E:
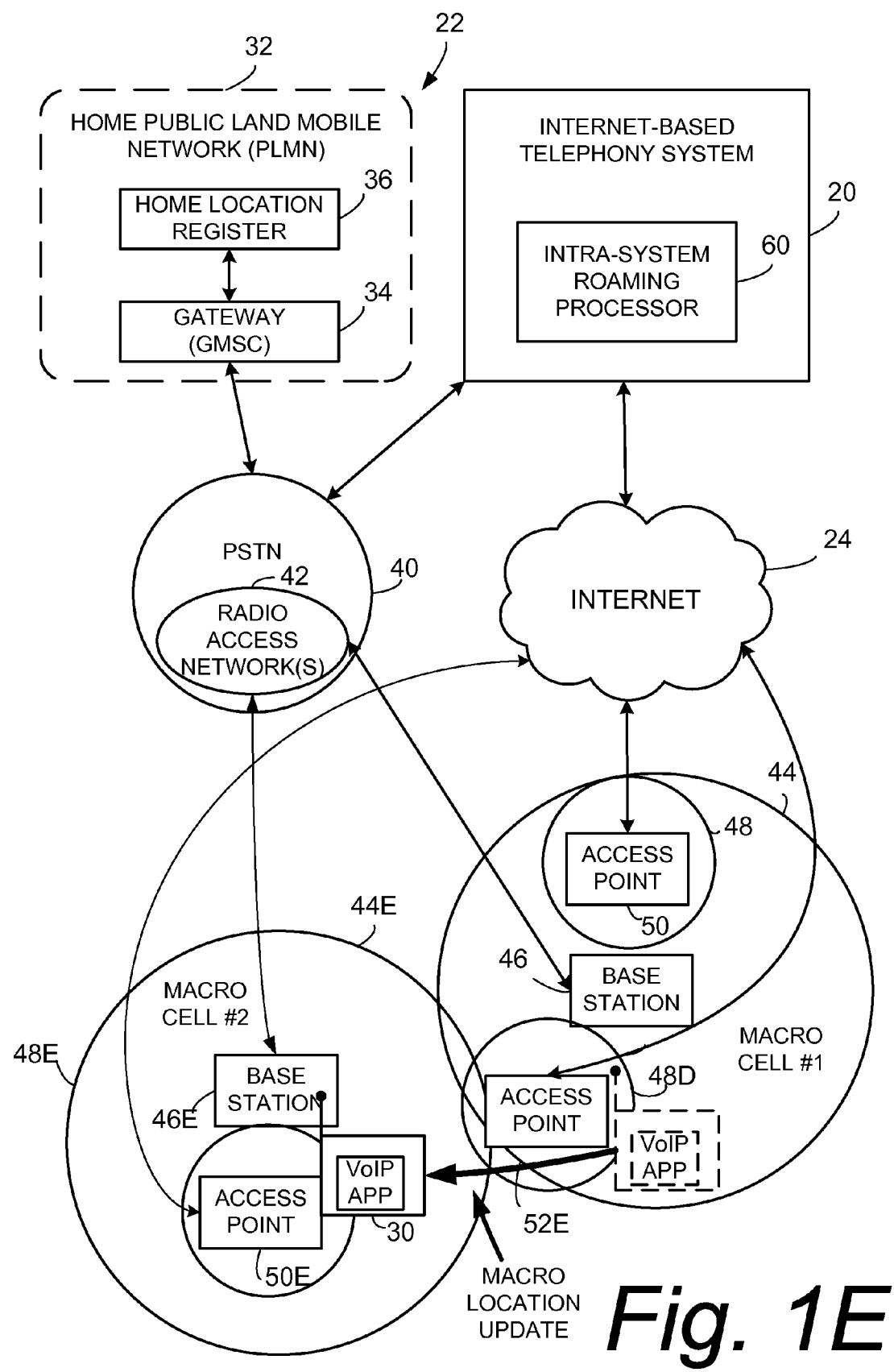
FIG. 1E is a diagrammatic view of the communications network of FIG. 1A, showing further aspects of the network and location/situation of a telephony device in an exemplary fifth roaming position.

FIG. 1E shows by roaming direction arrow 52E that telephony device 30 has from access point cell 48D of access point 50D, into access point cell 48E of access point 50E. The access point cell 48E may also be within the range of yet another macro cell, e.g., macro cell 44E, which is served by base station 46E. In the situation of FIG. 1E the access point cell 48E does not overlap with access point cell 48D, so that during at least a portion of its journey along arrow 52E the telephony device 30 is not covered by an access point with unlicensed frequencies. In such case, if the base station 46E of FIG. 1E is not a data-capable base station, e.g., does not have GPRS/3G/LTE capabilities, the telephony device 30 will be without data connection for a portion of the travel and during such data-less portion make a location update with respect to macro cell 44E. Thus during the data-less portion of the travel depicted by arrow 52E the telephony device 30 may not be within coverage of telephony system 20. However, upon gaining access to access point cell 48E the telephony device 30 may again be within coverage of telephony system 20.

While FIG. 1A-FIG. 1E have illustrated telephony device 30 as being a wireless or mobile telephony device, it should be understood that the technology disclosed herein is not limited to wireless or mobile telephony devices. That is, telephony device connection to the internet-based telephony system 20 is not necessarily a wireless connection. For example, a user can use this roaming service of the presently disclosed technology by installing an application on a computer.

In at least some exemplary embodiments and modes the telephony device 30 is a wireless device and thus has mobility characteristics. As such, wireless terminal may roam in and out of "coverage" of the internet-based telephony system 20, or may roam between access points through which telephony device 30 is served by internet-based telephony system 20 and/or macro cells having data connection handling capability. Examples of such intra-system roaming have already been mentioned with respect to FIG. 1A, FIG. 1B, FIG. 1C, FIG. 1D, and FIG. 1E. FIG. 1B shows a situation in which telephony device 30 has roamed between access points that are located so that their cells at least partially overlap and facilitate essentially continuous service of (e.g., access to) internet-based telephony system 20 during the roaming. FIG. 1C shows a situation in which roaming of telephony device 30 between access point 50 and 50C is discontinuous in the sense of WiFi coverage, but nevertheless is still within coverage of telephony system 20 in view of the data connection handling capabilities of macro cell 46C. The travel along arrow 52E of FIG. 1E shows a discontinuous roaming with respect to internet-based telephony system 20, in view of the fact that along at least a portion of travel path 52E the telephony device 30 is not registered with internet-based telephony system 20 and may instead be served by a non-internet access provider, e.g., a radio access network of another carrier or network that does not have data connection handling capability.

It should be understood that, upon roaming through telephony system 20, e.g., when within coverage of access point 50 of FIG. 1A, when within coverage of access point 50B of FIG. 1B, when within coverage of data connection capable macro cell 46C of FIG. 1C, and when within coverage of access point 50D of FIG. 1D, a new execution of update signaling procedure 62 need not occur. As used herein, "access" to telephony system 20 means access to telephony system 20 after having previously been outside of telephony system 20, and does not mean attachment to a different access point 50. Indeed, switching between different access points for data connection does not have any impact on the internet-based telephony system 20, other than possibly to update the IP address of the telephony device 30, e.g., in record 90 of location register database 74, when the IP address is changed.

Thus the telephony device 30 may travel or roam in a manner such as that depicted by FIG. 1A-FIG. 1E. In conjunction with such roaming internet-based telephony system 20 receives notifications at different access times as telephony device 30 makes or receives access to service to the internet-based telephony system 20. At each new access after the telephony device 30 has been out of access of telephony system 20 (such as when coming within coverage of access point 50E of FIG. 1E after being out of coverage of telephony system 20) the internet-based telephony system 20: (1) stores appropriate information regarding the telephony device 30 (e.g., customer number and IMSI); and (2) sends a location update signal (such as signal 6-5 of FIG. 6) to the public land mobile network 32 associated with the customer. As explained herein, the location update signal is configured by the telephony system to cause the home location network 32 to register the internet-based telephony system 20 as a network visited by the telephony device 30 associated with the customer. In particular, the location update signal may include the Global Title (GT) of internet-based telephony system 20 as an indication of current location of telephony device 30. Then, upon occurrence of an incoming communication directed a called number associated with a customer having an account with the internet-based telephony system which includes the telephony device 30, the internet-based telephony system 20: (3) provides the public land mobile network 32 associated with the customer with a roaming number that causes the public land mobile network associated with the customer to route the incoming communication to the internet-based telephony system 20; and (4) upon receiving the incoming communication at the roaming number from the public land mobile network 32 associated with the customer, routes the communication through the Internet 24 to an IP address for a device included in the customer account for the respective access time.

Figure 2:
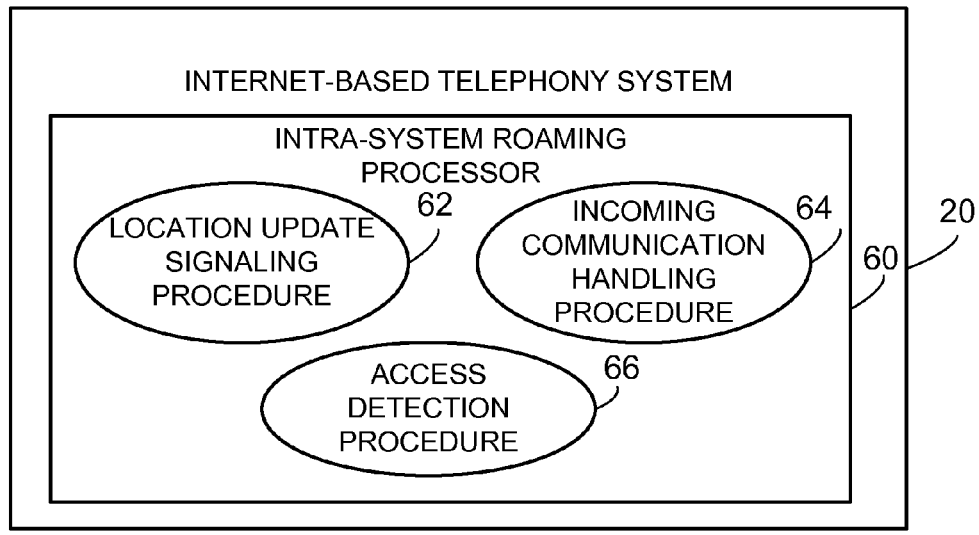
FIG. 2 is a flowchart showing exemplary procedures performed by an intra-system roaming processor according to an exemplary embodiment and mode.
Figure 3:
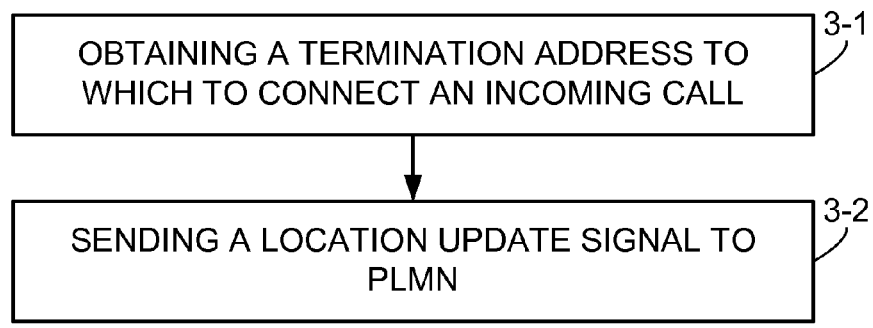
FIG. 3 is a flowchart showing exemplary basic acts or steps comprising an update signaling procedure according to an exemplary embodiment and mode.

As shown in FIG. 2, intra-system roaming processor 60 is involved in at least two separate procedures or operations, both of which facilitate the intra-system or CoIP roaming. A first such procedure, location update signaling procedure 62, comprises generation of location update signaling, and particularly location update signaling which is configured to cause the home location network 32 for the customer to register the internet-based telephony system 20 as a network visited by a mobile telephony device 30. Such generation occurs when telephony device 30 has access to service of the internet-based telephony system. FIG. 3, described further below, shows exemplary basic acts or steps which may comprise update signaling procedure 62. As understood hereinafter, in an exemplary implementation such location update signaling generated by intra-system roaming processor 60 provides PLMN home location register (HLR) 36 with a Global Title (GT) address of telephony system 20. In so doing, the home public land mobile network 32 is notified that telephony device 30 is roaming within an internet-based telephony system.

Figure 4:
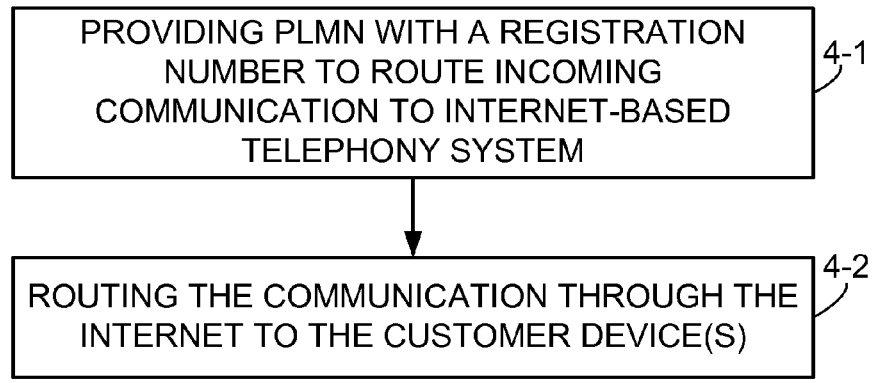
FIG. 4 is a flowchart showing exemplary basic acts or steps comprising an incoming communication handling procedure according to an exemplary embodiment and mode.

FIG. 2 also shows a second procedure or operation, known as incoming communication handling procedure 64. The incoming communication handling procedure 64 is performed by intra-system roaming processor 60 (as a result of previous implementation of the location update signaling) when the home public land mobile network 32 receives an incoming communication, e.g., an incoming call or SMS message for the telephony device 30. FIG. 4, described further below, shows exemplary basic acts or steps which may comprise incoming communication handling procedure 64.

When the home location network 32 directs an incoming communication for the telephony device 30 to the internet-based telephony system 30 as a result of implementation of the location update signaling, the intra-system roaming processor 60 executes the incoming communication handling procedure 64 to cause routing of the incoming communication through the Internet 24 to a device included in an account for the customer. Such device may or may not be the telephony device 30, depending on whether the customer has implemented any features such as call forwarding or ring list or the like.

It was mentioned above that update signaling procedure 62 is performed when telephony device 30 has access to service of the internet-based telephony system. In some exemplary embodiments and modes intra-system roaming processor 60 may detect communications with telephony device 30 through an access point 50, and as a result may automatically execute update signaling procedure 62 upon such detection. In other situations the intra-system roaming processor 60 may detect data communications with telephony device 30 if telephony device 30 receives a broadcast from a data connection-capable (e.g., GPRS type) base station 46, in the manner shown in FIG. 1C. For either situation—licensed frequency data connection through a macro cell as shown in FIG. 1C or unlicensed frequency data connection through a WiFi type access point 50—intra-system roaming processor 60 is shown in FIG. 2 as also optionally performing access detection procedure 66.

It should be understood that one or more, and preferably all, of update signaling procedure 62, incoming communication handling procedure 64, and access detection procedure 66, including actions and contexts described further herein, may be performed as a result of execution by intra-system roaming processor 60 of coded instructions, stored on computer-readable non-transitory media, which comprise the respective procedures. As such, the update signaling procedure 62, incoming communication handling procedure 64, and access detection procedure 66, either singularly or collectively, may comprise a computer program product.

Figure 5:
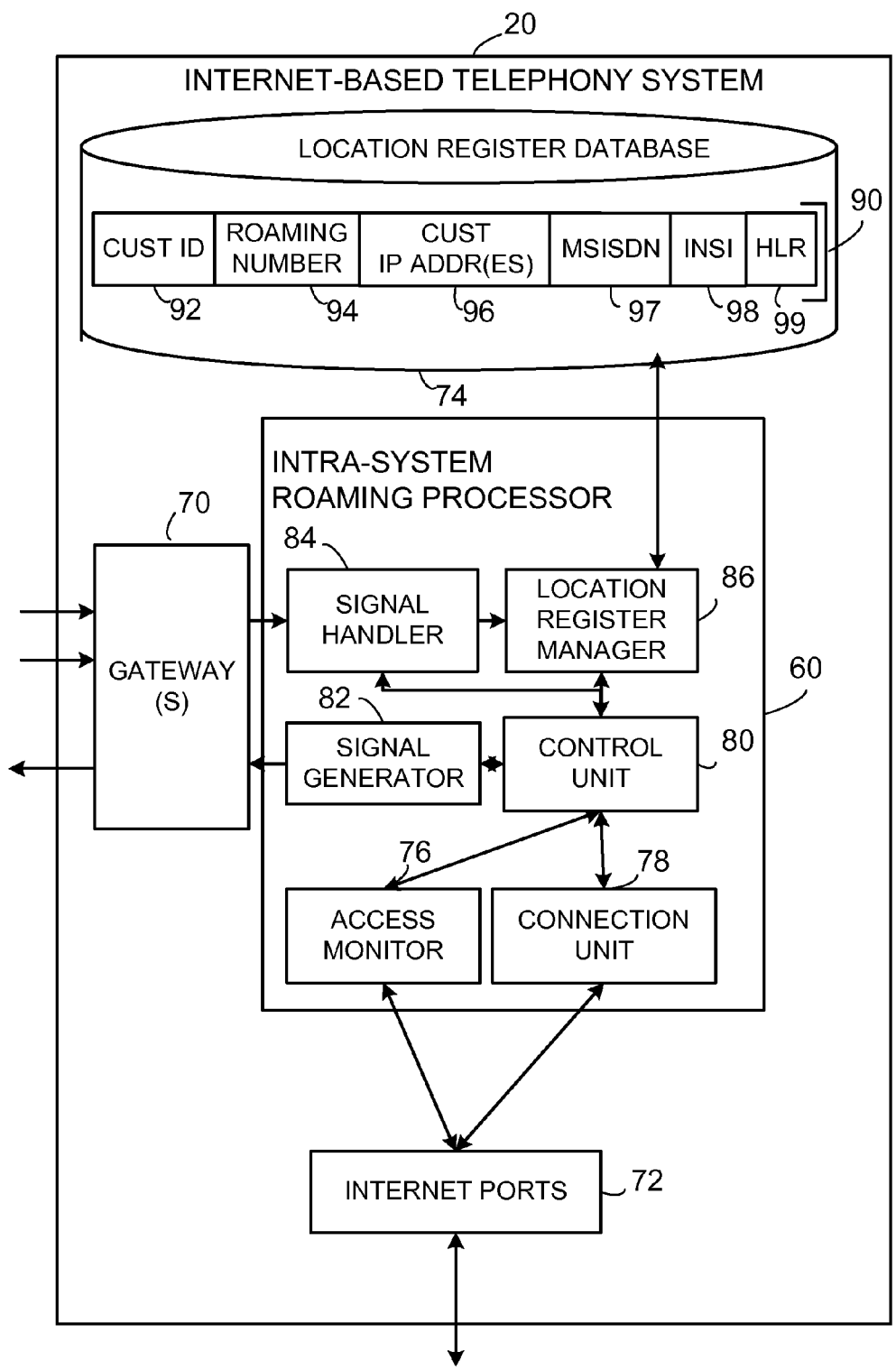
FIG. 5 is a schematic view of an exemplary embodiment of an Internet-based telephony system which facilitates intra-system roaming.

FIG. 5 shows exemplary functionalities and/or units of internet-based telephony system 20, as well as exemplary functionalities and/or units of intra-system roaming processor 60 according to a non-limiting, exemplary implementation embodiment. In addition to the previously mentioned intra-system roaming processor 60, FIG. 5 shows internet-based telephony system 20 as comprising one or more IP telephony system gateway(s) 70; IP telephony system Internet ports 72; and an IP telephony system database, which includes IP telephony system location register database 74. It should be kept in mind, however, that the internet-based telephony system 20 may be structured with different architectural units and functions in other implementations.

The IP telephony system gateway(s) 70 is/are configured to send or receive various signals or messages. For example, the IP telephony system gateway(s) 70 send the location update signal to the home location network; receive a roaming number request signal; and receive an incoming communication routing signal from the home location network, as herein described.

FIG. 5 further shows intra-system roaming processor 60 as comprising access monitor 76; connection unit 78; control unit 80; signal generator 82; signal handler 84; and location register manager or interface 86.

The access monitor 76 is configured to obtain certain information from the telephony device 30 when the telephony device has access to service to the internet-based telephony system 20. Such information obtained upon access to service includes a customer identifier for the customer and the International mobile Subscriber Identity IMSI of the telephony device 30. The customer identifier (CUST ID) may be a customer-selected user name or the like which is unique to the customer and agreed between the customer and telephony system 20. The customer may also have a password. Typically the customer identifier (CUST ID) and/or password are entered by the customer upon opening or activating an application of the telephony system 20 which is executed on the telephony device 30, e.g., a CoIP application 88 (see FIG. 16). The IMSI is obtained from a mobile telephony device where it is stored in a Subscriber Identity Module (SIM) card, with each IMSI uniquely identifying the mobile telephony device, its home wireless network, and the home country of the home wireless network.

The signal generator 82 is adapted, when the telephony device 30 has access to service to the internet-based telephony system 20, to configure a location update signal to cause the home location network 32 for the customer to register the internet-based telephony system 20 as a network visited by a telephony device associated with the customer.

The signal handler 84 is configured, upon receipt of the roaming number request signal, to provide the home location network 32 with a roaming number. The roaming number is configured to cause the home location network 32 to route the incoming communication as an incoming communication routing signal to the internet-based telephony system 20.

The control unit 80 is configured to coordinate and sequence the actions of access monitor 76; connection unit 78; signal generator 82; signal handler 84; and location register manager or interface 86.

FIG. 5 also shows IP telephony system location register database 74 as comprising a record 90 for a particular customer of internet-based telephony system 20. The record 90 is shown as comprising plural fields or information elements, including customer ID (CUST ID) field 92; roaming number field 94; customer IP address(es) field 96 (CUST IP ADDR(ES)); Mobile Subscriber Integrated Services Digital Network Number (MSISDN) field 97; International mobile Subscriber Identity (IMSI) field 98; and, Home Location Register (HLR) field 99. It will be understood that IP telephony system location register database 74 contains, e.g., records such as record 90 for many customers of internet-based telephony system 20.

Regarding the fields of the record 90 for a particular customer, in many situations the customer IP address which is stored in customer IP address(es) field 96 (DEVICE IP ADDR(ES)) will be the IP address of the telephony device 30. But in other situations the customer may have one or more other IP addresses stored in IP address(es) field 96, either in lieu of or in addition to the IP address of the telephony device 30. For example, if the customer has invoke a call forwarding feature, the customer IP address(es) field 96 may include the IP address of one or more devices to which an incoming communication should be forwarded other than to telephony device 30. As another example, the customer may invoke a ring list feature or a multiple called device feature for which plural devices are notified, either sequentially or simultaneously, of an incoming communication. It should be understood that, in order to accommodate these situations and features, customer IP address(es) field 96 may include IP address(es) of one or more devices in addition to or instead of the IP address of telephony device 30.

Regarding the IP address of telephony device 30, which may be stored in customer IP address(es) field 96, the telephony system 20 may receive notifications (e.g., push notifications) or responses to inquires from the telephony device 30 regarding any changed IP address of the telephony device 30. A change of IP address may occur, for example, when the telephony device 30 changes networks. As mentioned above, the IMSI is obtained from a mobile telephony device where it is stored in a Subscriber Identity Module (SIM) card. The Mobile Subscriber Integrated Services Digital Network Number (MSISDN) is the number used for routing calls to the subscriber, e.g., the number normally dialed to connect a call to the mobile phone. A SIM card has a unique IMSI that does not change, while the MSISDN can change in time, i.e. different MSISDNs can be associated with the SIM.

FIG. 3 shows exemplary basic acts or steps which may comprise update signaling procedure 62 according to an exemplary embodiment and mode. It will be recalled that update signaling procedure 62 is performed by intra-system roaming processor 60 when a telephony device associated with a customer of the telephony system 20 has access to service of the internet-based telephony system. It will be recalled that obtaining access to the service of the internet-based telephony system 20 may occur in various ways. For example, one way of acquiring access is through access point 50, e.g., using an unlicensed frequency or an access point cell. Another way, illustrated in FIG. 1C, is through a PLMN type data connection when the telephony device 30 is in a macro cell with data connection handling capabilities.

Act 3-1 comprises obtaining information regarding the telephony device 30 that has gained access to the telephony system 20. In a basic exemplary embodiment and mode, act 3-1 comprises obtaining the customer identifier and IMSI of the telephony device 30 that has gained access to and therefore roamed into telephony system 20.

Act 3-2 comprises the internet-based telephony system 20 sending a location update signal to the public land mobile network 32 associated with the customer. The location update signal of act 3-2 is configured by internet-based telephony system 20 to cause the home location network, e.g., home public land mobile network 32, to register the internet-based telephony system 20 as a network visited by the telephony device 30 associated with the customer.

Figure 6:
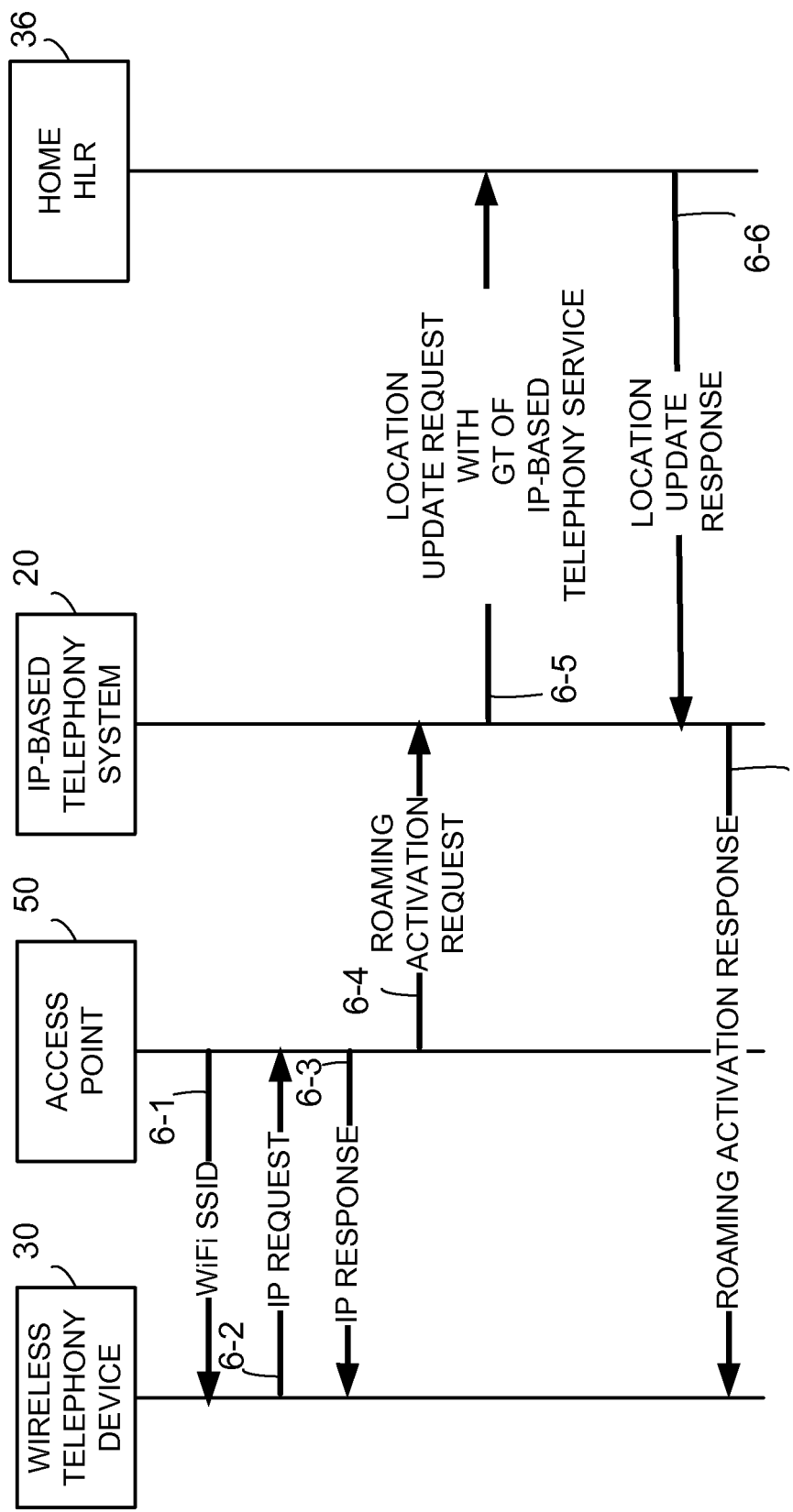
FIG. 6 is a diagrammatic view showing in more detail example acts and/or signals comprising or occurring in a context of a location registration operation performed in conjunction with intra-system roaming.

Acts of FIG. 3 may be understood in context of an exemplary scenario of events that include acts and signaling as depicted in FIG. 6. Act 6-1 comprises the telephony device 30 performing a network scanning operation to seek wireless coverage. In one exemplary embodiment and mode, the network scanning operation may result in obtaining an access point (e.g., WiFi) identifier, such as a service set identifier (SSID) of the access point 50. After obtaining the access point identifier, telephony device 30 sends an IP request message 6-2 to access point 50. If the IP request message 6-2 is successful, access point 50 returns an IP Response message 6-3 to telephony device 30. The foregoing explains how, when telephony device 30 is a wireless telephony device, it is determined when the telephony device is wirelessly connected for service to the internet-based telephony system, according to at least one exemplary embodiment and mode.

After obtaining Internet access, telephony device 30 sends a roaming activation request message 6-4 to intra-system roaming processor 60 of internet-based telephony system 20. The roaming activation request message 6-4 may include the customer identifier and the IMSI of the telephony device 30. In the intra-system roaming processor 60 of example embodiment of FIG. 5, the roaming activation request message 6-4 is received through IP telephony system Internet ports 72 and passed to access monitor 76 and control unit 80 of intra-system roaming processor 60. The intra-system roaming processor 60, having obtained the IMSI of the telephony device 30 which has gained access to 20, uses portions of the IMSI to determine where to send the location update signal. For example, the intra-system roaming processor 60 uses the country code (MCC) and operator code (MNC) of the IMSI to determine the PLMN 32 to which to send the location update signal.

The control unit 80 directs signal generator 82 to send location update request message 6-5 to PLMN home location register (HLR) 36 of the home public land mobile network 32 associated with the customer or account with which telephony device 30 is affiliated. Advantageously, location update request message 6-5 and other messages utilized herein may be configured in accordance with existing standards, e.g., GSM 09.02 standards, for example. In an example mode and embodiment, the location update signal of act 3-2 may be a GSM message "MAP-Location-Update" which is sent to the user's home location register (HLR) 36 in the user's home public land mobile network (PLMN) 32. The location update signal is received by a gateway 34, which forwards the location update signal to the appropriate HLR 36.

In addition, control unit 80 directs that record 90 for telephony device 30 in IP telephony system location register database 74 be updated so that roaming of telephony device 30 may be properly indicated in IP telephony system location register database 74. For example, control unit 80 notes appropriate information for the telephony device 30 which has just been granted access to the telephony system 20, and stores appropriate information for telephony device 30 in control unit 80. For example, control unit 80 directs that location register manager or interface 86 store in record 90 the customer identification information in customer number field 92 and the IMSI of the telephony device 30 in field 98. The control unit 80 may also obtain from other records of the customer the MSISDN of the telephony device 30 and store the MSISDN in field 97.

In the example embodiment of FIG. 5 location update request message 6-5 is sent through IP telephony system gateway(s) 70 and, in an exemplary embodiment and mode, is sent over a signaling system #7 (SS7) network to the customer's home public land mobile network (PLMN) 32. The location update request message 6-5 informs the PLMN home location register (HLR) 36 that the current location of telephony device 30 is in internet-based telephony system 20. In particular, the location update request message 6-5 provides PLMN home location register (HLR) 36 with the Global Title (GT) address of internet-based telephony system 20. In its memory PLMN home location register (HLR) 36 then pairs telephony device 30 with the Global Title (GT) of internet-based telephony system 20 so that, upon occurrence of any future incoming communication for telephony device 30, the PLMN home location register (HLR) 36 will be able to advise home public land mobile network 32 to direct the incoming communication to internet-based telephony system 20, as hereinafter explained. Thus, by sending to the PLMN home location register (HLR) 36 the Global Title (GT) address of internet-based telephony system 20, the internet-based telephony system 20 advises the home public land mobile network 32 that the telephony device 30 is roaming in another network—the network of the internet-based telephony system 20.

Upon completion of the storage of the Global Title (GT) address of internet-based telephony system 20, PLMN home location register (HLR) 36 sends location update response message 6-6 to intra-system roaming processor 60 of internet-based telephony system 20 to confirm that the location update has occurred. Upon receipt of location update response message 6-6, intra-system roaming processor 60 sends roaming activation response message 6-7 to telephony device 30. The foregoing illustrates how, in an exemplary embodiment and mode, the location update signal 6-5 enables the home location network to route the Map-Roaming-Number-Request (FIG. 7 Message '7-3') to a Global Title address of the internet-based telephony system 20.

In the example implementation of FIG. 5, the location update response message 6-6 may be received by signal handler 84, and notification of receipt of location update response message 6-6 is provided to control unit 80. The control unit 80 then directs access monitor 76 to send roaming activation response message 6-7 to telephony device 30. The roaming activation response message 6-7 is sent through IP telephony system Internet ports 72 and through Internet 24 to the customer device(s) associated with the IP address(es) as specified in IP ADDR(ES) field 96.

FIG. 4 shows exemplary basic acts or steps which may comprise incoming communication handling procedure 64 according to an exemplary embodiment and mode. Incoming communication handling procedure 64 is performed by intra-system roaming processor 60 upon occurrence of an incoming communication bearing a called party number associated with an account of the customer which includes the telephony device 30. As indicated above, the incoming communication may eventually be transmitted to telephony device 30 or, if another feature such as call forwarding or ring list is invoked, to other devices of the customer (as listed in CUST ADDR(ES) field 96) in addition to or in lieu of telephony device 30.

FIG. 4 shows basic acts performed subsequent to receipt an analysis of a call request which includes a called party number for the customer whose account includes the telephony device 30. Act 4-1 comprises providing the public land mobile network 32 associated with the customer with a roaming number that causes the public land mobile network 32 to route the incoming communication to internet-based telephony system 20. Act 4-2 comprises, upon receiving the incoming communication at the roaming number from the public land mobile network 32 associated with the customer, the internet-based telephony system 20 routing the communication through the Internet 24 to one or more customer device(s) that are associated with the called party number.

Figure 7:
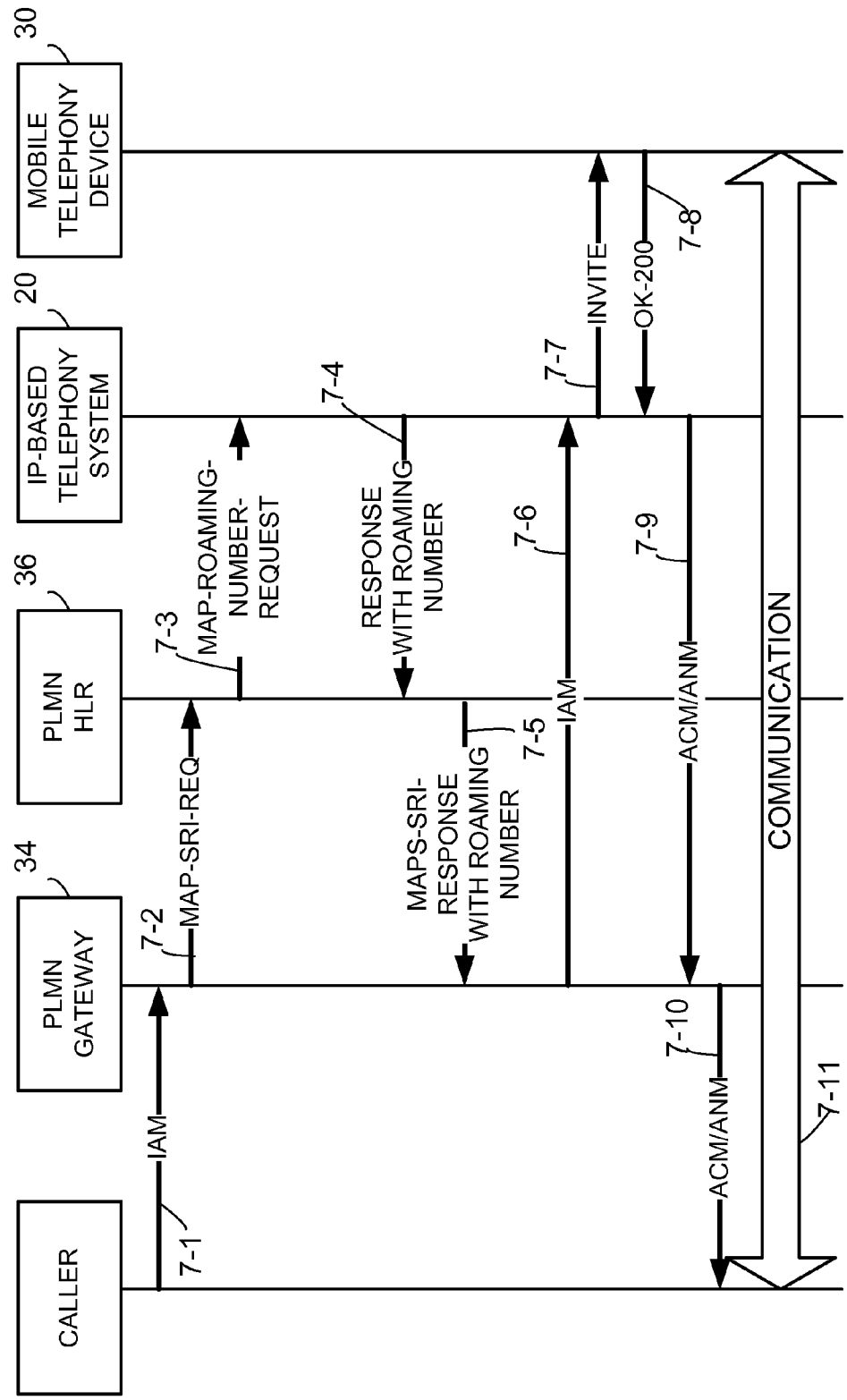
FIG. 7 is a diagrammatic view showing exemplary acts and/or signals comprising or occurring in a context of a communication connection operation performed in conjunction with intra-system roaming.

Acts of FIG. 4 may be understood in context of an exemplary scenario of events that include acts and signaling as depicted in FIG. 7. The incoming communication handling procedure 64 begins with a caller wishing to communicate with telephony device 30 sending an initial address message (IAM) 7-1 to telephony device 30. The initial address message (IAM) is typically the first message sent to inform a switch that a call has to be established, and includes, e.g., the called number (e.g., called party number), type of service (speech or data) and optional parameters. The initial address message (IAM) is ultimately sent (via various switches, if necessary) to PLMN gateway 34 (e.g., GMSC) of the home public land mobile network 32 for the customer associated with telephony device 30.

Upon receipt of IAM 7-1, PLMN gateway 34 invokes a Mobile Application Part (MAP) service package to send SendRoutingInformation (SRI) request message 7-2 to PLMN home location register (HLR) 36 of the customer's home public land mobile network 32. The SRI is a mobile application part (MAP) message sent by the gateway (GMSC) 34 to the HLR 36 to request routing information in order to route a call towards a mobile subscriber. As a result of the update signaling procedure 62 described above with reference to FIG. 3 and FIG. 6, the PLMN home location register (HLR) 36 has the Global Title of internet-based telephony system 20 stored as the location for devices of the called customer (which may include telephony device 30). Upon obtaining the Global Title (GT) of internet-based telephony system 20 as the location for telephony device 30, PLMN home location register (HLR) 36 in turn sends roaming number request message 7-3 to internet-based telephony system 20. The roaming number request message 7-3 may include a Global Title for the HLR 36 which sent the roaming number request message 7-3.

In the exemplary implementation of FIG. 5 the roaming number request message 7-3 is received through IP telephony system gateway(s) 70, handled by signal handler 84, and processed by control unit 80. The roaming number request message 7-3 may take the form of a standard GSM message, such as a MAP-PROVIDE-ROAMING-Number message and includes information that, e.g., enables control unit 80 to know for which telephony device 30 the incoming communication is addressed. For example, the roaming number request message 7-3 may include the Mobile Subscriber Integrated Services Digital Network Number (MSISDN) of the telephony device 30, the International mobile Subscriber Identity (IMSI) of the telephony device 30, and the Global Title (GT) of the internet-based telephony system 20. Receipt of the roaming number request message 7-3 enables location register manager or interface 86 to access the particular record 90 in IP telephony system location register database 74 that is associated with telephony device 30. The roaming number request message 7-3 may also include the Global Title for the HLR 36, which may be stored in HLR field 99 of record 90 in location register database 74.

Upon accessing the appropriate record 90 for telephony device 30, the location register manager or interface 86 returns to control unit 80 a roaming number from roaming number field 94 for telephony device 30. The roaming number may be permanently assigned to the telephony device 30 or it can be temporarily assigned, e.g., assigned to telephony device 30 as soon as there is a call (roaming number request) for it and then released upon finishing the call. The control unit 80 then prompts signal generator 82 to generate roaming number response message 7-4 that includes the roaming number for telephony device 30. The roaming number for telephony device 30 may also be stored in roaming number field 94 of the record 90. The telephony system 20 maintains a pool of roaming numbers, each roaming number being temporarily assigned to an incoming communication for the duration of the communication but thereafter returned to the pool for use in conjunction with another communication. The roaming number is also known as the "registration number" or "access number" for telephony device 30.

Upon obtaining the roaming number or access number for telephony device 30 from the roaming number response message 7-4, PLMN home location register (HLR) 36 sends SendRoutingInformation (SRI) response message 7-5 to the PLMN gateway 34. PLMN gateway 34 then sends initial address message (IAM) 7-6 for telephony device 30 to internet-based telephony system 20. The initial address message (IAM) 7-6 includes the roaming number or access number for telephony device 30 as obtained from intra-system roaming processor 60 of internet-based telephony system 20. The foregoing messages of FIG. 7 thus provide an understanding of how act 4-1, e.g., providing the public land mobile network 32 associated with the customer with a roaming number, is performed.

Upon receiving the initial address message (IAM) 7-6 with its roaming number or access number for telephony device 30, the internet-based telephony system 20 sends Invite message 7-7 through Internet 24 to the IP addresses of the one or more customer devices whose IP addresses may be listed in customer IP address(es) field 96. For sake of simplification, in the ensuing discussion it will be presumed that only the IP address of telephony device 30 is listed in customer IP address(es) field 96, although such may not be the case as explained previously. The Invite message is a Session Initiation Protocol (SIP) message that indicates a party is being invited to participate in a communication. The INVITE message may carry a Session Description Protocol (SDP) body with information regarding the media settings that the calling party supports/prefers e.g. codecs and media addresses. The internet-based telephony system 20 routes the Invite message 7-7 to the IP address(es) of whatever device(s) are listed in customer IP address(es) field 96. The internet-based telephony system 20 knows the IP address of telephony device 30 in view of receipt of the roaming number or access number for telephony device 30 provided in the initial address message (IAM) 7-6.

The Invite message 7-7 is received routed (through access point 50) to the IP address(es) in customer IP address(es) field 96, e.g., telephony device 30, to apprise the customer's addressed device(s) of the incoming communication. If customer's addressed device(s) accept(s) the incoming communication, the customer's addressed devic(es), e.g., telephony device 30, send(s) (through Internet 24) an OK-200 message 7-8 to internet-based telephony system 20. The OK 200 message 7-8 is a status code message that indicates that the Invite message 7-7 has succeeded. The "200 OK" SIP message is sent back to the calling party when the customer's addressed device(s) (e.g., telephony device 30) answers the communication, and usually contains a SDP body with the media settings that customer's addressed device(s) supports/prefers. In view of the success, internet-based telephony system 20 sends Address Complete Message/Answer Message (ACM/ANM) 7-9 to PLMN gateway 34. The PLMN gateway 34 thereafter relays Address Complete Message/Answer Message (ACM/ANM) 7-10 to the caller.

At this point communication may occur between the caller and customer's addressed device(s), e.g., telephony device 30. The communication is routed to and from the customer's addressed device(s) (e.g., telephony device 30) by internet-based telephony system 20, through Internet 24, and through access point 50 or the GPRS macro data network, using the IP address of customer's addressed device(s) and the IP address of telephony system 20. The routing of the communication through Internet 24 may be handled by connection unit 78 of internet-based telephony system 20. The foregoing thus illustrates an exemplary implementation of act 4-2, e.g., upon receiving the incoming communication at the roaming number from the public land mobile network 32 associated with the customer, the internet-based telephony system 20 routing the communication through the Internet 24 to the customer's addressed device(s), e.g., telephony device 30.

FIG. 7 thus describes routing of the incoming communication through the internet, ultimately to the customer's addressed device, for all kinds of data access connections, including wireless connection via WiFi/WiMAX or wireless connection via GPRS type data connection. Such routing is a link layer responsibility in the Transmission Control Protocol (TCP)/IP protocol stack.

Figure 8:
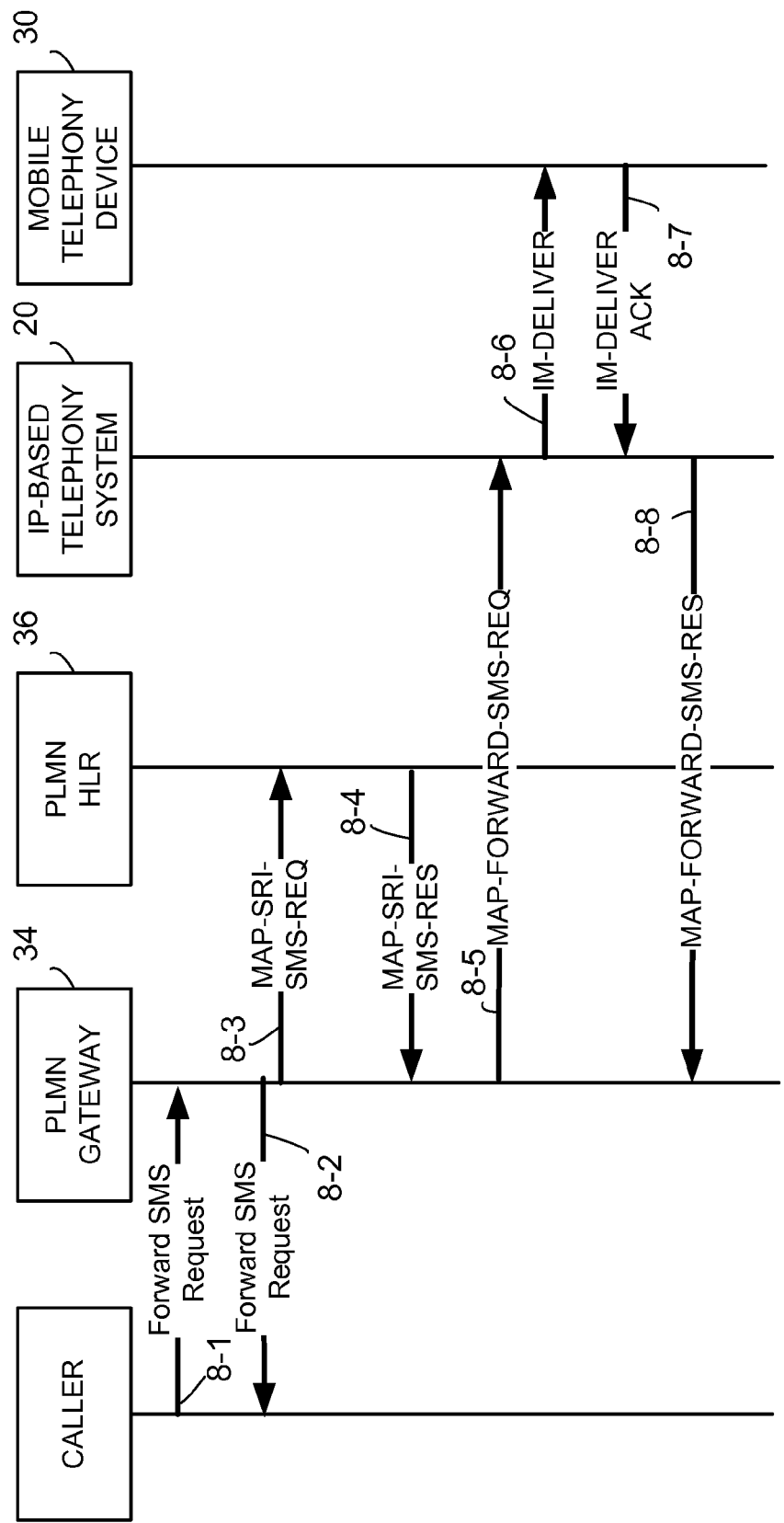
FIG. 8 is a diagrammatic view showing exemplary acts and/or signals comprising or occurring in a context of a short message service (SMS) communication connection operation performed in conjunction with intra-system roaming.

Whereas FIG. 7 illustrates signaling that may be appropriate for a generic communication, FIG. 8 shows signaling and acts that may be specialized for an incoming short message service (SMS) communication. The Short Message Service may be realized by the use of the Mobile Application Part (MAP) of the SS#7 protocol, with Short Message protocol elements being transported across the network as fields within the MAP messages.

The discussion and signaling of FIG. 8 presumes that the update signaling procedure 62 has already been successfully performed. FIG. 8 begins with a calling terminal, which may be a mobile station (MS), sending a Map-Forward-SMS-Request message 8-1, ultimately to PLMN gateway 34 of the home public land mobile network 32 for the called party number, e.g., the telephony device 30, to which the short message service (SMS) communication is intended. For a SMS communication the PLMN gateway may actually be a SMSC gateway. The Map-Forward-SMS-Request message 8-1 includes the text or content of the short message service (SMS) communication as well as the International mobile Subscriber Identity (IMSI) of the called terminal (e.g., telephony device 30) and possibly other information. Receipt of the Map-Forward-SMS-Request message 8-1 is acknowledged by a Map-Forward-SMS-Response message 8-2. After finalizing the receiving process including receipt of the Map-Forward-SMS-Request message 8-1, the PLMN gateway 34 sends a MAP-SRI-SMS-Request message 8-3 (MAP SEND_ROUTING_INFO_FOR_SMS) to PLMN home location register (HLR) 36 for telephony device 30 in order to request the present location of telephony device 30, e.g., for the addressed of the visited MSC. In view of previous performance of update signaling procedure 62, the PLMN home location register (HLR) 36 has associated the Global Title (GT) of internet-based telephony system 20 with internet-based telephony system 20, and therefore returns the Global Title (GT) of internet-based telephony system 20 in a MAP-SRI-SMS-Response message 8-5 to PLMN gateway 34.

Knowing the Global Title (GT) of internet-based telephony system 20 as the location of telephony device 30, PLMN gateway 34 sends a MAP-Forward-SMS-Request message 8-5 to internet-based telephony system 20 using SS#7 signaling. The MAP-Forward-SMS-Request message 8-5 includes the International mobile Subscriber Identity (IMSI) of the called telephony device 30 as well as the text or content of the short message service (SMS) communication. The MAP-Forward-SMS-Request message 8-5 may be received by IP telephony system gateway(s) 70 of internet-based telephony system 20, and particularly a gateway that handles short message service (SMS) communications. The incoming MAP-Forward-SMS-Request message 8-5 may be routed to control unit 80, which through location register manager or interface 86 accesses IP telephony system location register database 74 to obtain, from customer IP address(es) field 96, the IP address(es) of the customer's addressed device(s) associated with the telephony device 30 having the customer number, e.g., the International mobile Subscriber Identity (IMSI), included in the MAP-Forward-SMS-Request message 8-5.

Knowing the IP address of the telephony device 30 for which the short message service (SMS) communication is intended, internet-based telephony system 20 obtains the IP address(es) of the telephony device 30 or whatever other customer's addressed device(s) may be included in customer IP address(es) field 96 in addition or in lieu of the IP address of telephony device 30. The internet-based telephony system 20 sends IM-Deliver message 8-6 through Internet 24 (and either through access point 50 or a macro cell of a data network) to the IP address for customer's addressed device(s). In an exemplary embodiment and mode the access point 50 transmits the short message service (SMS) communication over the radio or air interface to telephony device 30. The IM-Deliver message 8-6 includes the content of the short message service (SMS) communication as authored by the calling terminal Upon receipt of the short message service (SMS) communication as included in the IM-Deliver message 8-6, the telephony device 30 sends IM-Acknowledge message 8-7 through Internet 24 to internet-based telephony system 20. Thereafter internet-based telephony system 20 sends Map-Forward-SMS-Response message 8-8 to PLMN gateway 34.

The update signaling procedure 62 and incoming communication handling procedure 64 described above occur when telephony device 30 is within coverage of telephony system 20. As explained above, being within coverage of telephony system 20 may involve being with coverage of an access point 50, e.g., within access point cell 48, or being within coverage of a macro cell with data connection handling capability (e.g., a macro cell of a GPRS network). Since the telephony device 30 may be mobile or wireless, telephony device 30 may travel away from an access point 50 or a data-connection capable cell, and thus out of coverage of telephony system 20. Internet-Based telephony system 20 has a periodic checking mechanism (e.g., a watchdog method) to detect if the telephony device 30 loses its data connection (of either WiFi type or GPRS type) with internet-based telephony system 20.

Telephony device 30 may lose data coverage in either of two situations. In a first roam-out-of-coverage situation, the telephony device 30 roams from internet-based telephony system 20 back to a macro mobile (radio access network) network that does not have data-connection handling capability, e.g., a non-GPRS network. In such situation, the telephony device 30 will send a location update to its HLR 36, updating the most recent location as that of the macro RAN network. The HLR 36 will then send a MAP-Cancel-Location-req message to internet-based telephony system 20.

In a second roam-out-of-coverage situation there is no coverage at all, neither from the access cells nor any macro mobile (radio access network) network. In this second roam-out-of-coverage situation the communication will still transfer to internet-based telephony system 20. For a SMS communication the internet-based telephony system 20 tries to transfer the message to telephony device 30 (and/or devices for other customer's addressed device(s)) over Internet 24, but may eventually notice that the telephony device 30 is out-of-coverage. At that point the internet-based telephony system 20 replies to the SMSC gateway with an out-of-coverage message. For a call (e.g., voice call) situation the internet-based telephony system 20 may provide or play an out-of-coverage message and/or transfer the call to the subscriber's voice mail as maintained by internet-based telephony system 20.

The travel or movement of telephony device 30 may be toward a macro cell served by a radio access network (RAN) of a "visited" public land mobile network (PLMN) [in contrast to the home PLMN 32]. In some situations such as that shown by arrow 9A-1 in FIG. 9A, the movement of the telephony device 30 may be away from access point cell 48 and into a macro cell such as macro cell 44. In other situations, such as that depicted in FIG. 9B, the telephony device 30 may still be in coverage of an access point cell 48 as the telephony device 30 moves (e.g., in direction of arrow 9B-1) toward a new macro cell served by a radio access network.

Figure 10A:
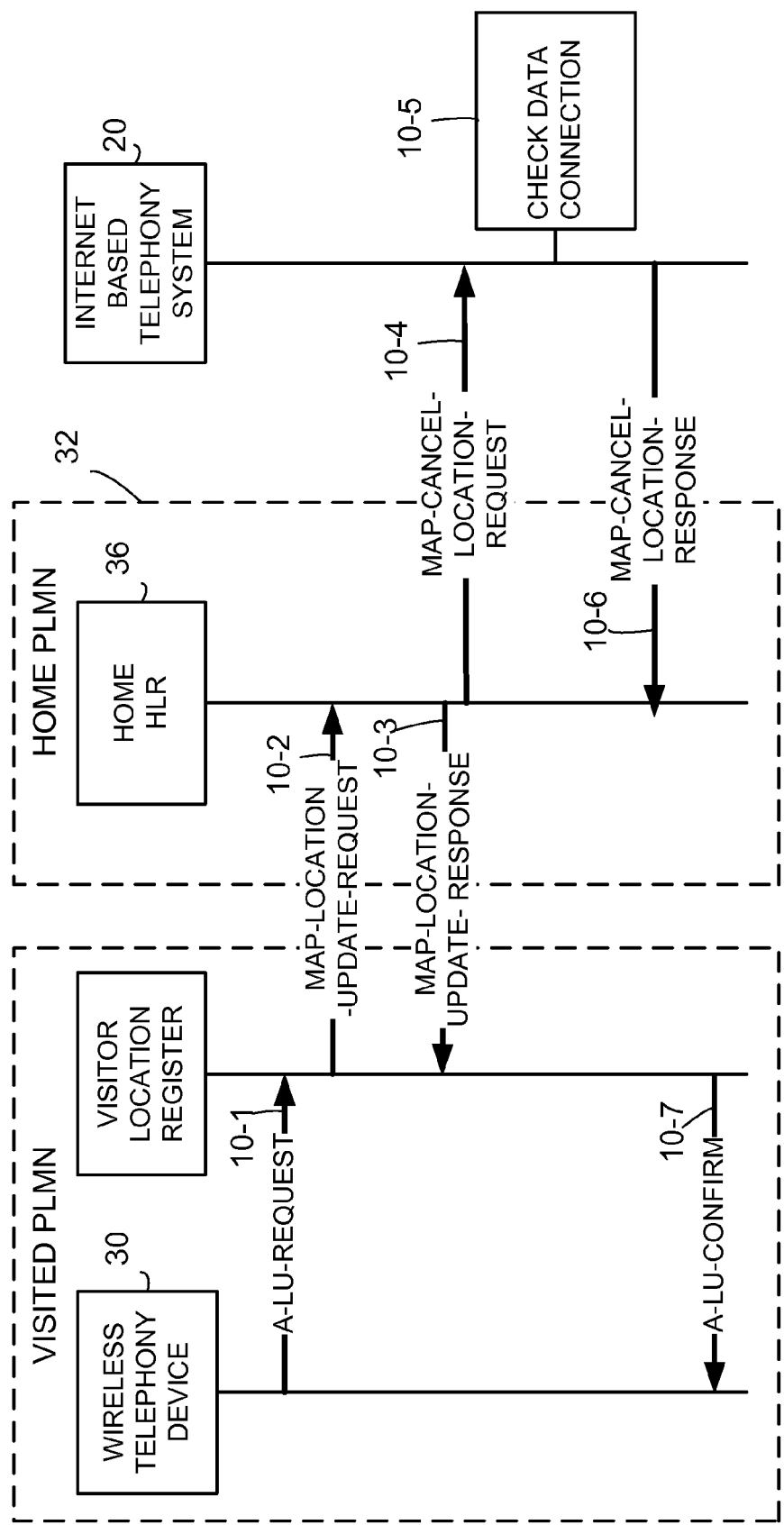
FIG. 10A and FIG. 10B are diagrammatic views showing exemplary acts and/or signals comprising or occurring in a context of differing scenarios of a location update for a visited PLMN when a telephony device moves to a macro cell.
Figure 10B:
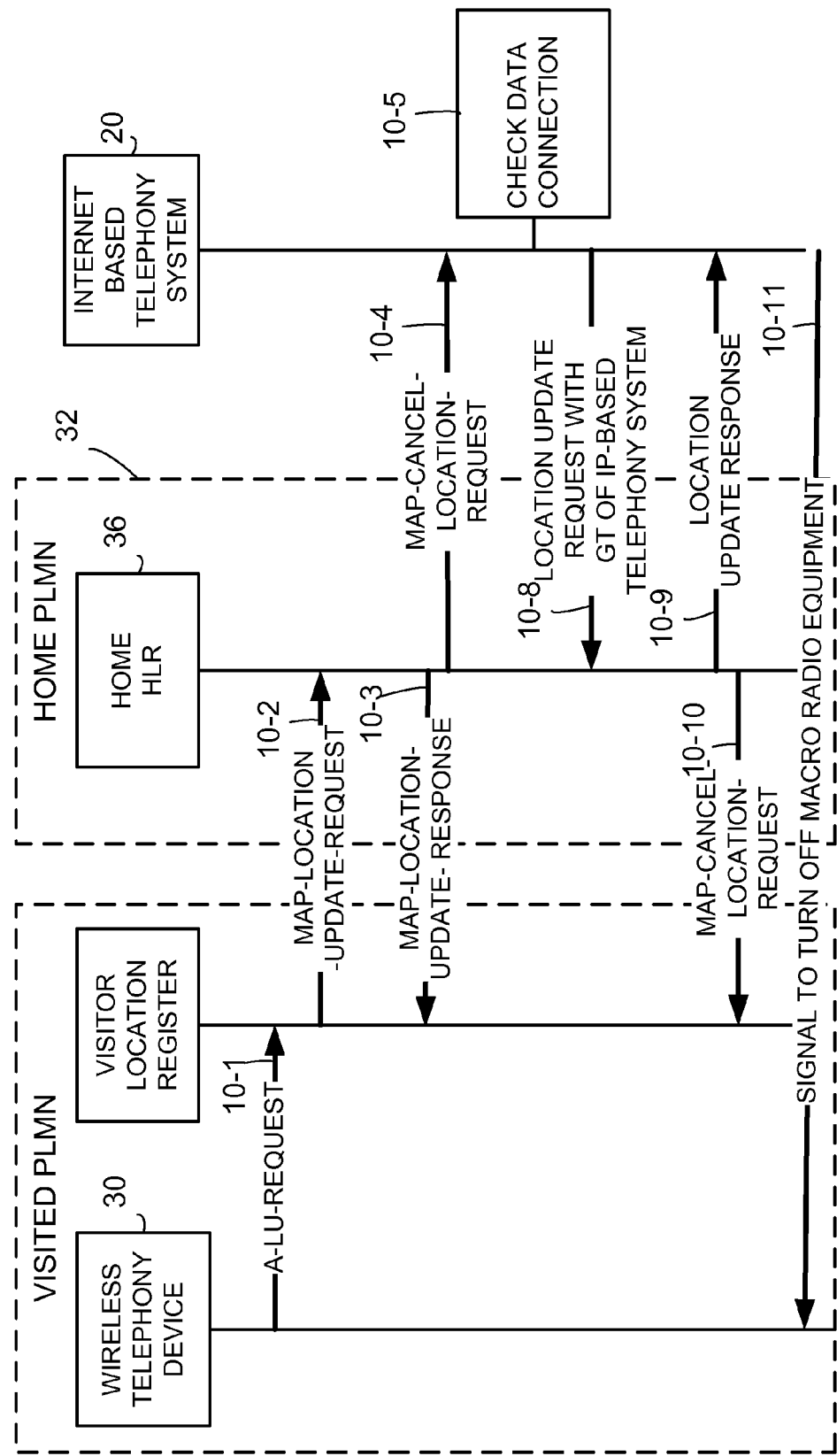

FIG. 10A and FIG. 10B illustrate exemplary acts and signaling involved in a potential location update for a wireless terminal 30 initially within coverage of internet-based telephony system 20 but moving toward a new macro cell. When detecting coverage of another or newly visited PLMN, e.g., of the macro cell, for example, telephony device 30 sends a location update request message (A-LU-Req) 10-1 to a visitor location register (VLR) of the visited PLMN. The visitor location register (VLR) of the visited PLMN then sends location update request 10-2 (MAP-Location-Update-Request) to the PLMN home location register (HLR) 36 of home public land mobile network 32. In so doing, the PLMN home location register (HLR) 36 registers the visited PLMN as the current location of telephony device 30. Upon making such registration PLMN home location register (HLR) 36 sends location update response 10-3 (MAP-Location-Update-Response) to the VLR of the visited PLMN. In addition, PLMN home location register (HLR) 36 sends cancel location request message 10-4 (MAP-Cancel-Location-Request) to internet-based telephony system 20. The cancel location request message 10-4 may be particularly sent to internet-based telephony system 20, e.g., to a visitor location register (VLR) of internet-based telephony system 20. Upon receipt of the cancel location request message 10-4, the internet-based telephony system 20 may as act 10-5 check whether its data connection with telephony device 30 is still active, e.g., whether the data connection between internet-based telephony system 20 and telephony device 30 still exists.

Figure 9A:
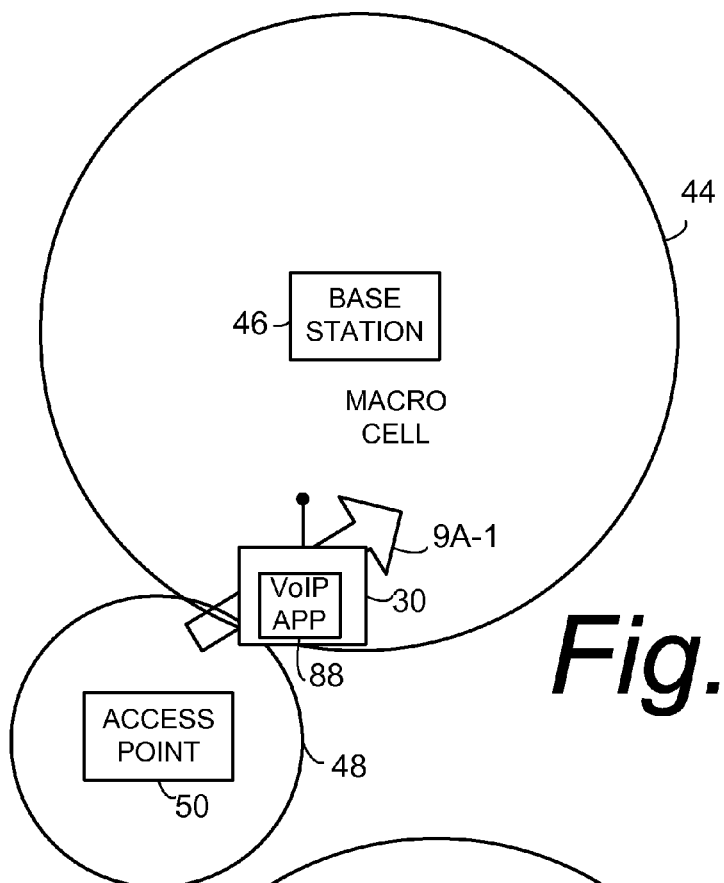
FIG. 9A, FIG. 9B, and FIG. 9C are diagrammatic views showing exemplary scenarios of movements of telephony devices which may cause location update operations.

FIG. 10A shows a scenario, such as that of FIG. 9A, in which there is no longer a data connection between internet-based telephony system 20 and telephony device 30. As shown in FIG. 10A, if there is no longer a data connection between internet-based telephony system 20 and telephony device 30, internet-based telephony system 20 returns a cancel location response message 10-6 (MAP-Cancel-Location-Response) to PLMN home location register (HLR) 36. By about this time the VLR of the visited PLMN has sent a location update confirm message (A-LU-Confirm) 10-7 to telephony device 30.

Figure 9B:
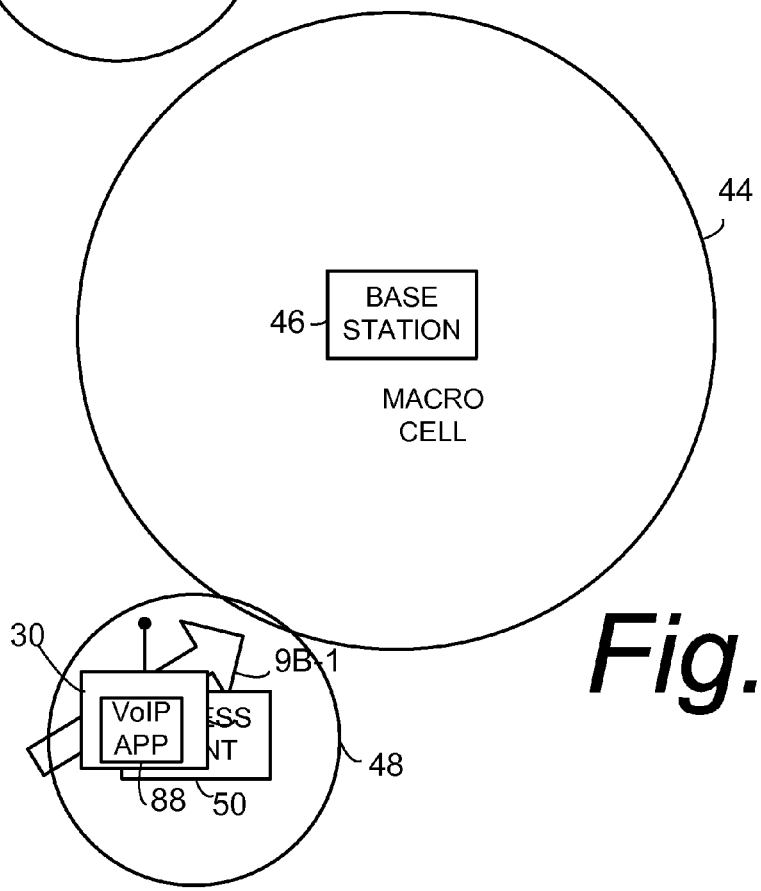

FIG. 10B shows a scenario, such as that of FIG. 9B, in which there still is a data connection between internet-based telephony system 20 and telephony device 30. As shown in FIG. 10B, if there still is a data connection between internet-based telephony system 20 and telephony device 30 as determined at act 10-6, as act 10-8 the internet-based telephony system 20 sends a location update request with the Global Title (GT) of the internet-based telephony system 20 to the PLMN home location register (HLR) 36 of the home public land mobile network 32 in order to cancel out or override the location update initiated by the macro radio access network. The PLMN home location register (HLR) 36 should then, in response, send a location update response message 10-9 back to internet-based telephony system 20, as understood, e.g., from FIG. 6. In addition, the PLMN home location register (HLR) 36 sends a MAP-CANCEL-LOCATION-REQUEST message back to the VLR as act 10-10. Yet further, as act 10-11 the internet-based telephony system 20 may send a signal over Internet 24 to telephony device 30 to instruct CoIP application 88 to turn off the portion of transceiver 110 that processes the macro radio communications (e.g., turn off the GSM part of the radio equipment of telephony device 30).

Figure 9C:
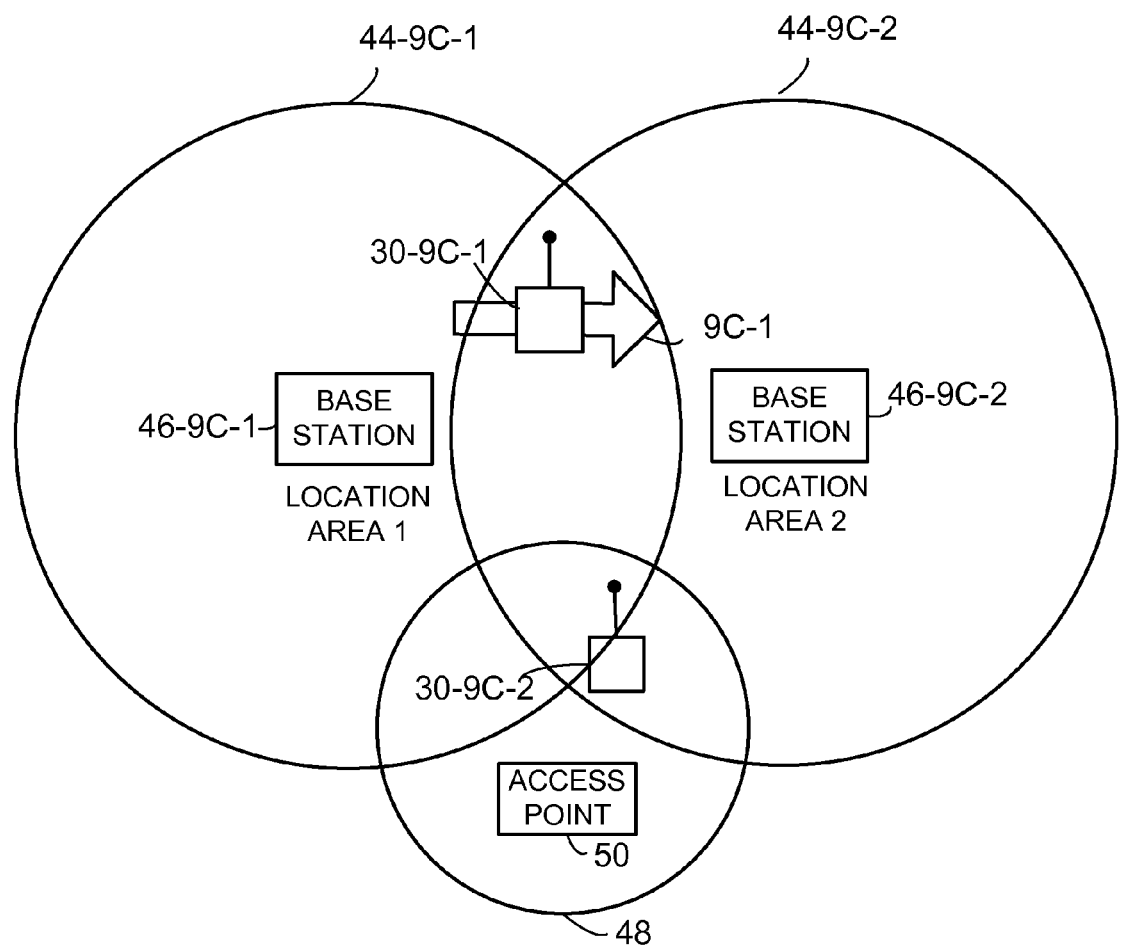

FIG. 9C shows a scenario in which telephony device 30-9C-1 is traveling between two macro cells 44-9C-1 and 44-9C-2 (e.g., GSM cells) of differing location areas (location area 1 and location area 2, respectively) that partially overlap. As is understood by those skilled in the art, the respective macro base stations 46-9C-1 and 46-9C-2 transmit broadcast signals over the broadcast control channel (BCCH). These channels are point-to-multipoint and are unidirectional in the downlink direction. The broadcast signals carry a repeating pattern describing/identifying the respective base station serving the cell. The broadcast signals are picked up by mobile stations (MS) that may travel into the cell. The telephony device can detect the relative strength of the signals from the various base stations on the respective BCCH channels. The telephony device monitors the relative strength of available base stations for the best signal strength. If the best base station changes, such change triggers an uplink request by the telephony device on a common control channel (CCCH) to the best base station, to request access to the system of the best base station.

In the FIG. 9C example, telephony device 30-9C-1 may initially be in Location Area 1 (LA1) served by base station 46-9C-1. As telephony device 30-9C-1 travels east along arrow 9C-1 towards Location Area 2 (LA2), telephony device 30-9C-1 first enters an overlap between the LA1 and LA2 cells. In the overlap, the telephony device 30-9C-1 checks the signals received on BCCH from each of base station 46-9C-1 and 46-9C-2. Initially, base station 46-9C-1 of LA1 may provide the better signal for telephony device 30-9C-1. However, as telephony device 30-9C-1 continues to travel eastward, at some point in the overlap the base station 46-9C-2 of LA2 may provide the better signal. At that point, telephony device 30-9C-1 sends a request on CCCH for access to base station 46-9C-2. This access request on CCCH triggers the base station 46-9C-2 of LA2 to set up a dedicated control channel (DCCH), which is the bidirectional link between the telephony device 30-9C-1 and LA2. The base station 46-9C-2 of LA2 will also send a location update request to its base station controller (BSC), which in turn sends the request to mobile switching center (MSC). The MSC looks up telephony device 30-9C-1 based on its IMSI, then sends a location update to the relevant HLR (in the manner understood from previous descriptions herein). In turn, the HLR sends a location cancel "request" (e.g., a confirmation) to the prior roaming carrier, e.g., to location area LA1. The base station of location area LA1 will then send a response, and the HLR will send a confirmation to LA2.

The activities of telephony device 30-9C-1 of FIG. 9C as just described provide, e.g., insight into another scenario, e.g., the scenario of telephony device 30-9C-2 of FIG. 9C, and provide further insight as to how acts of FIG. 10B may be applicable to the telephony device 30-9C-2 of FIG. 9C. The telephony device 30-9C-2 of FIG. 9C, like telephony device 30-9C-1, may have formerly been in coverage of macro base station 46-9C-1 so that Location Area 1 was previously listed as the stronger Location Area for telephony device 30-9C-2 of FIG. 9C. At the moment shown in FIG. 9C the telephony device 30-9C-2 is within access point cell 48, and thus within coverage of the telephony system 20. As such, a location update has already been performed with respect to telephony device 30-9C-2 in accordance with the techniques described herein, so that the internet-based telephony system 20 is already identified in the home HLR of telephony device 30-9C-2 as a network visited by the telephony device. In other words, IP telephony system 20 is registered at the HLR of the telephony device 30-9C-2 as the roaming carrier. While within coverage of the IP telephony system 20, telephony device 30-9C-2 still keeps track of its last best macro cell (e.g., cell 44-9C-1) and monitors the BCCH of available macro cells. Even thought it is located within access cell 48, telephony device 30-9C-2, for any of several reasons at some point may detect through the received BCCHs that there is a better macro base station (e.g., base station 46-9C-2 of Location Area 2) than the macro base station (e.g., base station 46-9C-1 of Location Area 1) to which telephony device 30-9C-2 is presently connected. Such reasons may include movement of telephony device 30-9C-2 closer toward location area LA2 or otherwise changing radio conditions that favor location area LA2 over location area LA1. As soon as telephony device 30-9C-2 detects through the received BCCHs that base station 46-9C-2 of Location Area 2 is the better macro base station, the telephony device 30-9C-2 sends a request to access the new and better macro base station (e.g., base station 46-9C-2). As understood from previous discussion, e.g., the discussion of FIG. 10B, for example, the access request to the new and better macro base station ultimately triggers a location update to the HLR for telephony device 30-9C-2, with the result that Location Area 2 of base station 46-9C-2 replaces IP telephony system 20 as the roaming carrier. When location update to Location Area LA2 is made, telephony system 20 will receive the map-location-cancellation-request in like manner as act 10-4 of FIG. 10B.

Upon receipt of a map-location-cancellation-request, telephony system 20 may check as act 10-5 to determine whether there is still a data connection between IP telephony system 20 and telephony device 30-9C-2 despite movement of telephony device 30-9C-2 between two macro cells. If data connectivity still exists between IP telephony system 20 and telephony device 30-9C-2, as act 10-8 the internet-based telephony system 20 may send a location update request with the Global Title (GT) of the internet-based telephony system 20 to the PLMN home location register (HLR) 36 of the home public land mobile network 32 for telephony device 30-9C-2 in order to cancel out or override the location update initiated by the macro radio access network. Thus, IP telephony system 20 regains its status as the visited network for telephony device 30-9C-2. For the scenario of telephony device 30-9C-2 of FIG. 9C other acts of FIG. 10B may also be preformed as previously described.

Figure 11:
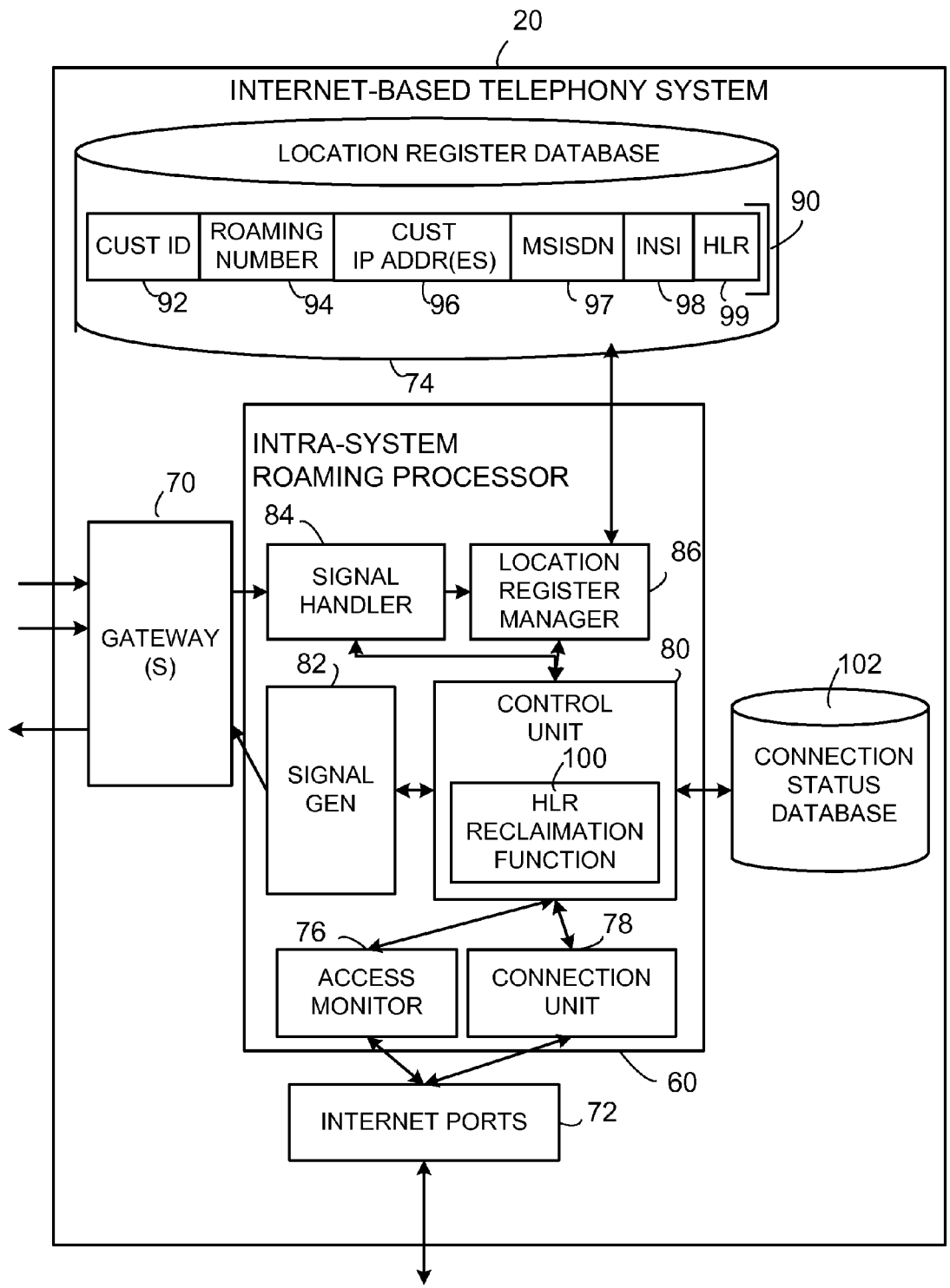
FIG. 11 is a schematic view of an exemplary embodiment of an Internet-based telephony system which facilitates intra-system roaming and includes an HLR reclamation feature.

As mentioned above, act 10-5 comprises determining whether there is still a data connection between IP telephony system 20 and telephony device 30-9C-2. Act 10-5 may be accomplished in various ways. For example, in an exemplary embodiment illustrated in FIG. 11, IP telephony system 20 may comprise HLR reclamation function 100 and may also maintain a connection status database 102. The connection status database may comprise or exist in conjunction with a Session Initiation Protocol (SIP) registration server, or alternatively be subsumed in or comprise location registration database 74. For example, for each record the location registration database 74 may include a field that indicates connection status.

Regardless of how the connection status database 10 may be implemented, act 10-5 may comprise the HLR reclamation function 100 of IP telephony system 20 checking the status database to determine whether an indication has been set in connection status database 102 that a data connection still exists between IP telephony system 20 and telephony device 30. Such indication (a data connection still-alive indication) may be set by receipt of a recent message (e.g., a registration message) from telephony device 30. Alternatively, the intra-system roaming processor 60, and HLR reclamation function 100 of control unit 80 in particular, may periodically or otherwise send a prompt message (e.g., "ping") to the telephony device 30 on the last-known IP address of telephony device 30 in an attempt to validate connectivity, and upon receipt of a response to the ping may set the indication in connection status database 100 that the data connection is still viable. Should the data connection be found viable despite receipt of a map-location-cancellation-request, the HLR reclamation function 100 may execute the further acts of FIG. 10B including sending a location update request with the Global Title (GT) of the internet-based telephony system 20 to the PLMN home location register (HLR) 36 of the home public land mobile network 32 for telephony device 30-9C-2.

In some situations the IP telephony system 20 may receive another map-location-cancellation-request even after sending an act 10-8-type location update request with the Global Title (GT) of the internet-based telephony system 20. In other words, after trying to reclaim the HLR for the telephony device 30-9C-2, the IP telephony system 20 may receive another map-location-cancellation-request. Such another map-location-cancellation-request may occur, for example, in a situation in which the telephony device 30-9C-2 is within access point cell 48 but also appears to be on or near a boundary of two competing macro cells. For example, when in a boundary or macro cell-straddling situation the base station 46-9C-1 and base station 46-9C-1 may alternate in having the stronger BCCH signal, so that the telephony device 30-9C-2 believes it is compelled to perform yet another location area update for sake of the change of stronger macro base station/location areas.

Figure 12:
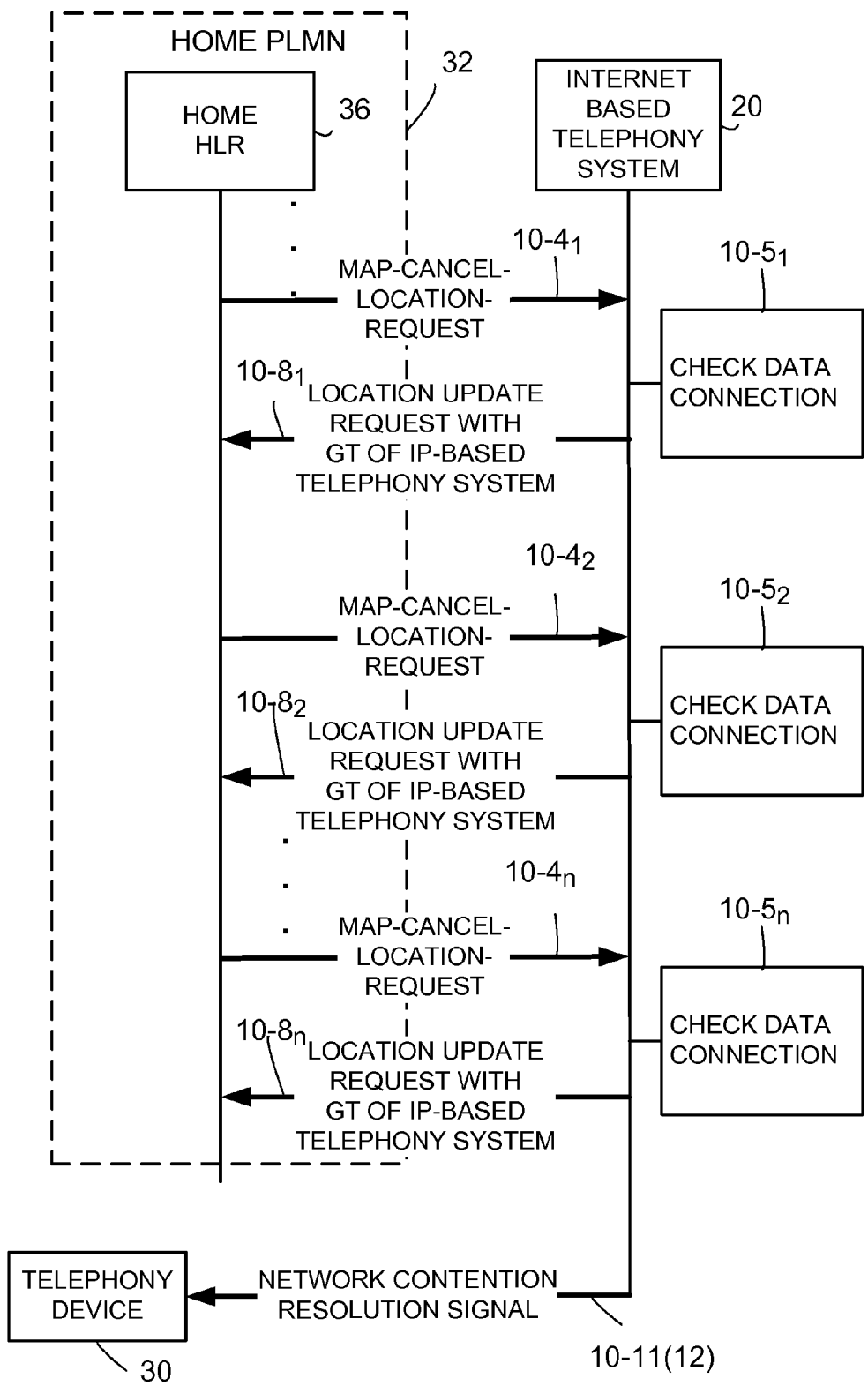
FIG. 12 and FIG. 12A-FIG. 12D are diagrammatic views showing exemplary acts and/or signals comprising or occurring in a context of a scenario wherein a telephony device, still within coverage of an access point cell, hovers at or near a border between macro cells, according to various example implementations.

In the above regard, consider the situation shown in FIG. 12. FIG. 12 resembles portions of FIG. 10B, showing primarily a repetition of acts 10-4 through 10-8 in the context of the IP telephony system 20 and home PLMN 32 (not showing other acts and aspects of FIG. 10B for sake of simplicity and emphasis). FIG. 10B shows IP telephony system 20 receiving a first map-cancel-location-request signal 10-4$_1$, but thereafter as act 10-5$_1$ determining that there is still a viable data connection between IP telephony system 20 and telephony device 30-9C-2 and accordingly sending as act 10-8$_1$ a location update request with the Global Title of IP telephony system 20. Acts 10-4$_1$ may occur, for example, when the BCCH signal strength of macro base station 46-9C-2 exceeds the BCCH signal strength of macro base station 46-9C-1. But after IP telephony system 20 reclaims the HLR for telephony device 30-9C-2 by performing act 10-8$_1$, the situation may change such that the BCCH signal strength of macro base station 46-9C-1 exceeds the BCCH signal strength of macro base station 46-9C-2. The change in relative strengths of the BCCH signal strength of two macro base stations may result in a second map-cancel-location-request signal of act 10-4$_2$ being sent to IP telephony system 20 in view of the BCCH signal strength of macro base station 46-9C-1 exceeding the BCCH signal strength of macro base station 46-9C-2 (which causes the HLR to believe that macro base station 46-9C-1 should now be registered as the visited network). Upon receipt of the second map-cancel-location-request signal of act 10-4$_2$, the HLR reclamation function 100 of IP telephony system 20 executes act 10-5$_2$ to check if the there is still a viable data connection between IP telephony system 20 and telephony device 30-9C-2. If so, as act 10-8$_2$ the IP telephony system 20 again sends a location update request with the Global Title of IP telephony system 20, and thereby seeks to "undo" the visited network change wrought by the change among the competing macro base stations. If sets of acts such as 10-4, 10-5, and 10-8 repeat a predetermined number of times, e.g., n integer number of times (e.g., in a predetermined or specified time interval), the HLR reclamation function 100 may, as act 10-11(12), issue a network contention resolution signal.

FIG. 12 thus shows a set of acts, e.g., acts 10-4$_i$, 10-5$_i$, and 10-8$_i$, which may be repeated for plural iterations (iterations i=1 through i=n being illustrated in FIG. 12). If the set of acts 10-4$_i$, 10-5$_i$, and 10-8$_i$ occur a predetermined number of times, e.g., if there are a predetermined number of iterations of the set (i.e., if i reaches the predetermined number), then as act 10-11(12) the IP network service 20 sends the network contention resolution signal to telephony device 30.

Figure 13:
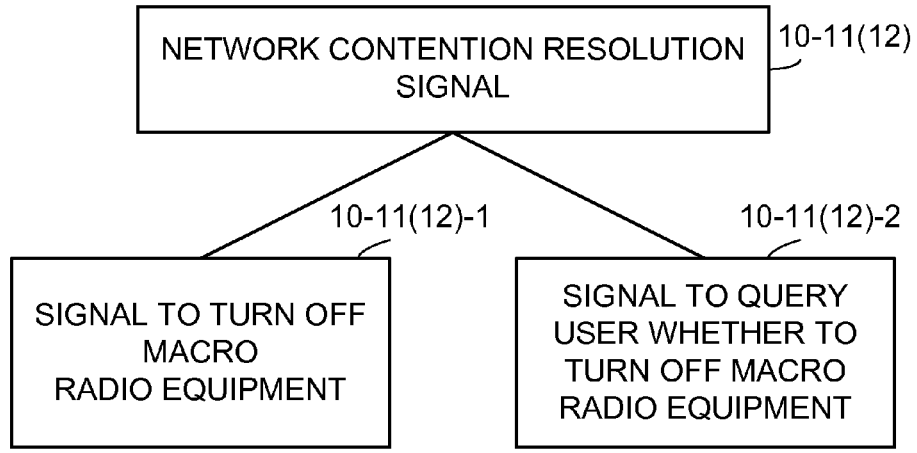
FIG. 13 is a diagrammatic view showing exemplary implementations of a network contention resolution signal.

FIG. 13 shows that the network contention resolution signal may take various forms, including either a signal to disable macro communication capability of the telephony device, e.g., turn off the macro radio equipment (depicted by signal 10-11(12)-1 in FIG. 13) or a signal to query the user whether to turn off the macro radio equipment (depicted by signal 10-11(12)-2 in FIG. 13). Turning off the macro radio equipment of telephony device 30-9C-2 may comprise turning off, e.g., the particular antennas of telephony device 30-9C-2 involved in the macro radio transmission, e.g., the GSM antennas of telephony device 30-9C-2. Turning off the macro radio equipment of telephony device 30-9C-2 relieves the IP telephony system 20 from having to repeatedly "undo" or "override" the macro HLR registration which, despite the still-viable data connection between IP telephony system 20 and telephony device 30, results from the competition between macro stations or macro location areas.

Signal 10-11(12)-1 in FIG. 13 depicts that such turn off of macro radio equipment may be essentially automatic, e.g., without involvement or consultation with the user or customer of telephony device 30-9C-2. On the other hand, signal 10-11(12)-2 in FIG. 13 comprises or results in a query to the user of telephony device 30-9C-2, e.g., a prompt message generated to elicit a determination and response from the user to ascertain whether the user wants to terminate macro radio equipment services or not. Such prompt message may be output to the user over any appropriate user interface, e.g., a displayed output or audible output, and the response may be obtained through an appropriate user interface such as a keyboard or user input touch sensitive screen, for example. Providing network contention resolution signal in the form of signal 10-11(12)-2 of FIG. 13 may provide the user with an opportunity to decide whether it is more important for the user to have the advantages of the IP telephony system 20 (typically including lower cost) or continued service of the macro radio network(s).

Figure 12A:
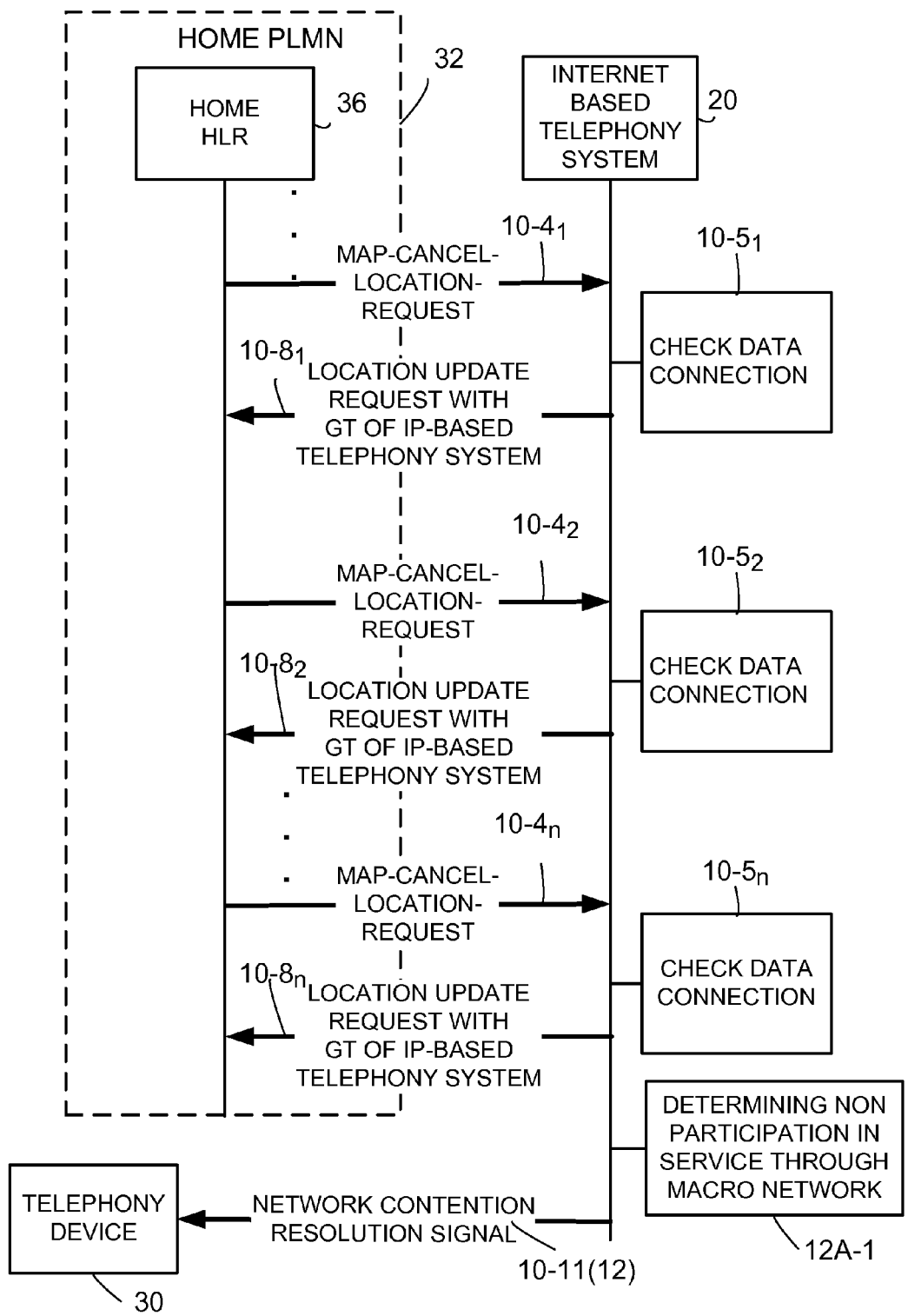

Whereas providing network contention resolution signal in the form of signal 10-11(12)-2 of FIG. 13 may provide the user with an opportunity to decide the importance of preserving macro radio communication capability, in some example implementations it may be desirable to for the IP network 20 to restrain itself from deactivating the macro radio equipment of the telephony device 30 when the telephony device is participating in a service provided through a macro radio network. That is, in some example implementations it may be preferable for the IP telephony network 20 to check or evaluate certain conditions or factors before sending a network contention resolution signal, e.g., before deactivating the macro radio equipment of the telephony device 30. Accordingly, FIG. 12A shows an example implementation in which HLR reclamation function 100 of intra-system roaming processor 60, as act 12A-1, essentially checks whether the telephony device 30 is not participating in a service provided through a macro network before sending a network contention resolution signal, e.g., before disabling the macro radio equipment of the telephony device.

Figure 14:
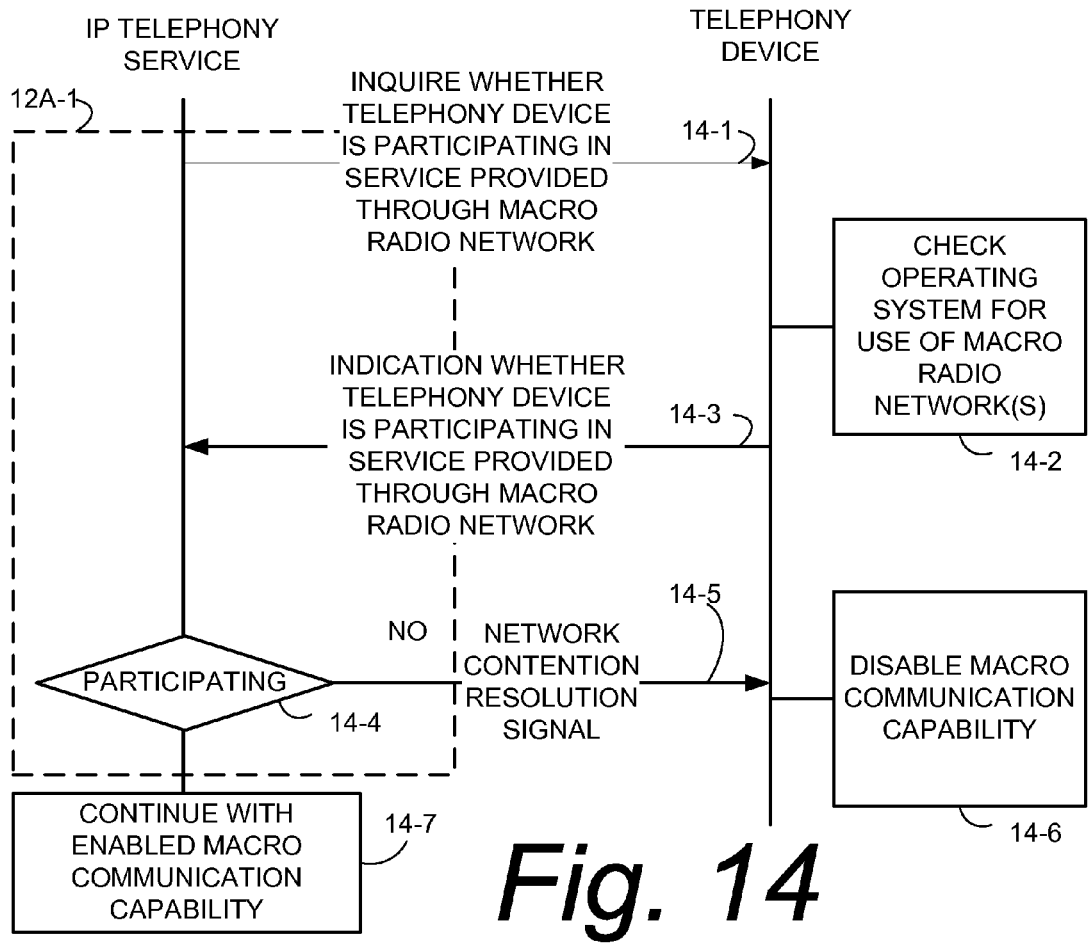
FIG. 14 is a diagrammatic view illustrating an example embodiment and mode comprising confirming that a telephony device is not participating in a service provided through a macro network before sending a network contention resolution signal.

FIG. 14 illustrates an example embodiment and mode of how act 12A-1 (checking whether the telephony device is not participating in a service provided through a macro network) may be implemented. Act 14-1 of FIG. 14 comprises the IP telephony service and HLR reclamation function 100 in particular sending an inquiry signal or message to telephony device 30. The inquiry signal of act 14-1 requests that the telephony device 30 investigate whether telephony device 30 is currently using any service which is currently provided through a macro radio network, and to report results of the investigation. Act 14-2 of FIG. 14 shows the telephony device 30 making an investigation/determination whether telephony device 30 is currently using any service which is currently provided through a macro radio network. Such investigation/determination by telephony device 30 may be made by requesting CoIP application 88 to make a call to the operating system of telephony device 30. In this regard, the operating system of telephony device 30 may include certain interactive functions that provide operating system status information to applications executed in conjunction with the operating system. As act 14-3 the telephony device 30 provides, and the IP telephony system 20 receives, an indication of whether the telephony device is participating in a service provided through a macro radio network.

If the IP telephony system 20 determines as act 14-4 that the telephony device 30 is not participating in a service provided through a macro radio network, then as act 14-6 the IP telephony system 20 may send its network contention resolution signal to telephony device 30. Upon receipt of the network contention resolution signal, telephony device 30 may (as act 14-6, disable or turn off the macro radio capability (e.g., macro radio equipment) of telephony device 30.

If the IP telephony system 20 determines as act 14-4 that the telephony device 30 is currently participating in a service currently provided through a macro radio network, then as act 14-7 the IP telephony system 20 continues to operate with the telephony device having enabled macro communication capability. As such, in act 14-7 it is still possible that another location update from a macro radio network cancels or otherwise negates the IP telephony service 20 as being the visited PLMN.

Thus, it is understood, e.g., from the foregoing, that FIG. 14 illustrates an example embodiment and mode wherein the IP telephony network 20 confirms that a telephony device 30 is not participating in a service provided through a macro network before sending a network contention resolution signal, e.g., before disabling the macro communication capability of the telephony device 30.

Figure 12B:
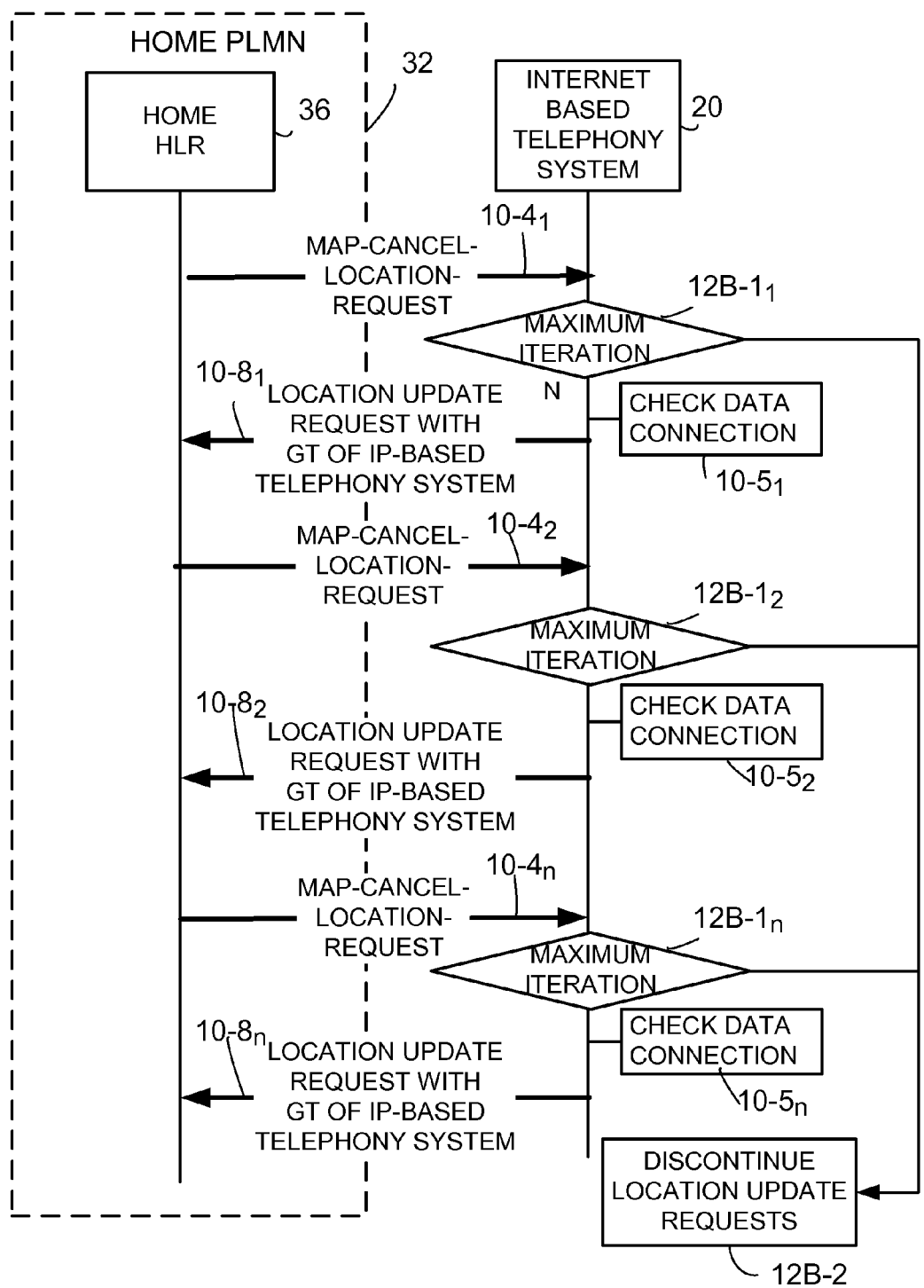

FIG. 12B, like FIG. 12, shows a set of acts, e.g., acts 10-4$_i$, 10-5$_i$, and 10-8$_i$, which may be repeated for plural iterations (iterations i=1 through i=n being illustrated in FIG. 12B). In the example embodiment depicted by FIG. 12B, however, after act 10-8$_i$ has been performed a maximum number of times (e.g., a maximum number of set iterations), 10-5$_i$, and 10-8$_i$, are not performed for another iteration. In other words, after the IP telephony service has exchanged location update requests with one or more macro networks for a maximum number of times, the IP telephony service 20 no longer contends with the macro networks for the visited PLMN status for the telephony device 30. FIG. 12B thus includes acts 12B-1$_i$ (i=1, . . . n) which comprise checking whether the maximum number of set iterations has occurred. For example, before a execution of acts 10-5$_n$, and 10-8$_n$, act 12B-12 is performed by checking whether the maximum permitted number of set iterations is n−1. If the maximum permitted number of set iterations is n−1, then the n$^{th}$ iteration of the set (e.g., 10-5$_2$ and 10-8$_2$) is not completed and processing continues instead with act 12B-2. Act 12B-2 comprises the IP telephony service 20 discontinuing its location update requests. As long as the maximum permitted number of set iterations is not reached, the IP telephony service proceeds to perform the next iteration of the full set (e.g., 10-5$_n$, and 10-8$_n$), and so forth until the maximum number of iterations is reached.

Figure 12C:
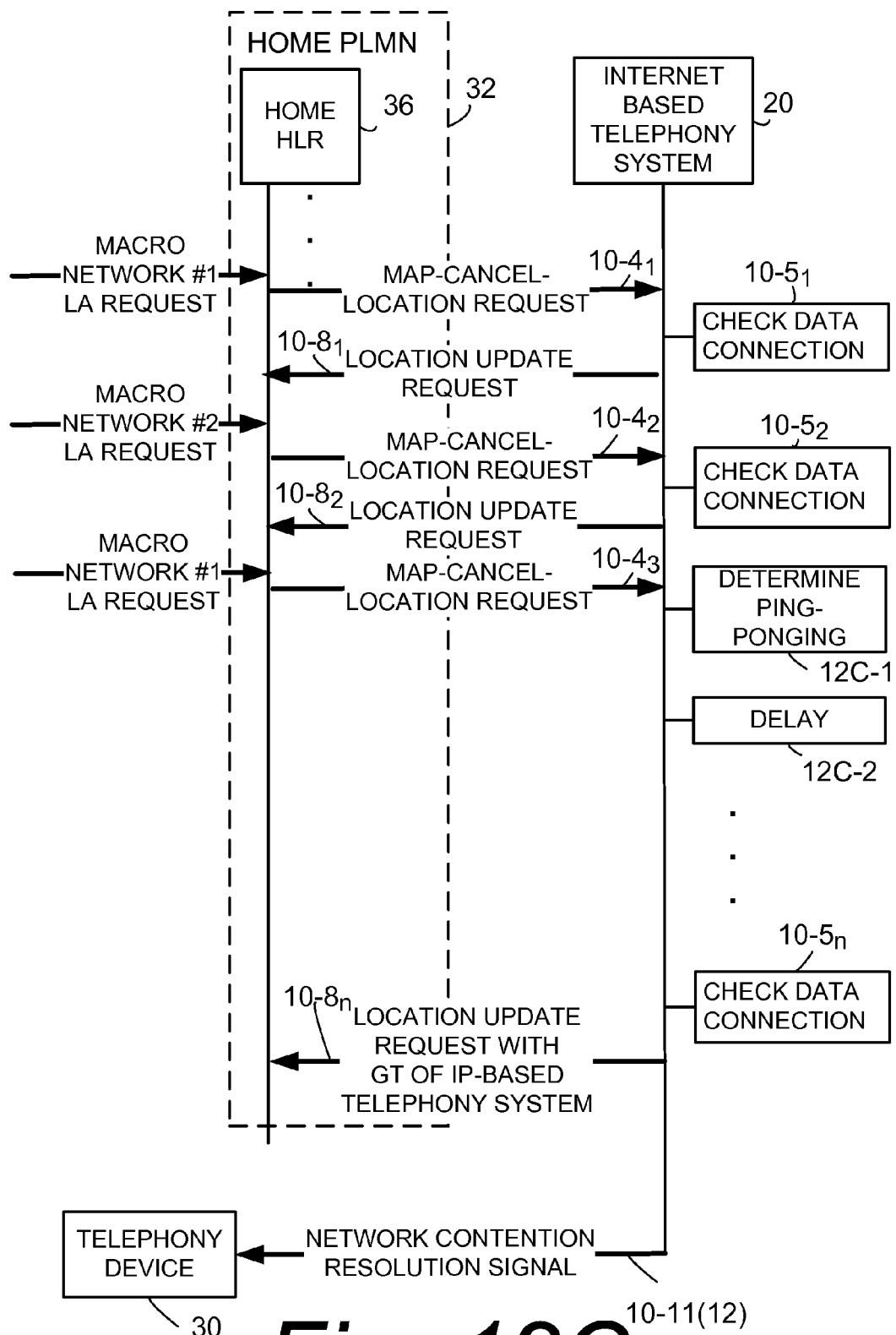

FIG. 12C shows the HLR reclamation function 100 of internet-based telephony system 20 attempting to gain status as the visited network in a situation in which plural macro networks are also sending location update request messages in alternating or competing fashion, as could occur for telephony device 30-9C-2 in the scenario of FIG. 9C, for example. In FIG. 12C a first macro network (macro network #1) sends a location update request, which causes the home HLR 36 to send the cancel location request 10-4$_1$ to internet-based telephony system 20. As act 10-5$_1$ the HLR reclamation function 100 checks the data connection of internet-based telephony system 20 with telephony device 30, and upon confirming the data connection as act 10-8$_1$ sends the location update request (providing Global Title of internet-based telephony system 20) to home HLR 36. But thereafter a second macro network (macro network #2) has stronger BCCH signal than the first macro network and sends a location area (LA) update to home HLR 36. Despite the data connection between telephony device 30 and internet-based telephony system 20 and existing registration of internet-based telephony system 20 as the visited network, in view of the location update request from the second macro network the home HLR 36 sends (as act 10-4$_2$) a cancel location request to internet-based telephony system 20. The internet-based telephony system 20, not willing to easily relinquish its status as visited network, again as act 10-5$_2$) checks the data connection with telephony device 30 and, if the data connection is still viable, sends location area update request 10-8$_2$ to home HLR 36. At some point thereafter the first macro network again has stronger signal than the second macro network, so that the first macro network sends a location area update request to home HLR 36, resulting in cancellation location request 10-4$_3$ being sent to internet-based telephony system 20.

At this point the HLR reclamation function 100 notices that its two most recent location area update requests 10-41 and 10-42 have been cancelled in a manner that indicates a wrestling or ping-ponging between internet-based telephony system 20 and at least one macro network for visited network status. For example, the HLR reclamation function 100 may, as act 12C-1, detect a ping-pong situation when cancel location request messages are received within a predetermined time interval of the location update request messages sent by internet-based telephony system 20, or when cancel location request messages are received within a predetermined time interval of other cancel location request messages. Upon detecting the ping-pong or alternation between networks for visited network status, the HLR reclamation function 100 may as act 12C-2 impose a delay before HLR reclamation function 100 takes any further action. The delay provides time for the competition between the competing macro networks, e.g., the first macro network (macro network #1) and the second macro network (macro network #2), to settle down so that the internet-based telephony system 20 may thereafter hopefully need to compete only with whichever one of the first macro network and the second macro network becomes the dominant macro network for the telephony device 30. Thus the time period for the delay of act 12C-2 is chosen to provide the telephony device 30 with sufficient time to travel towards or otherwise become more partial to one of the two competing macro networks. After expiration of the delay, as act 10-5$_n$ the HLR reclamation function 100 again checks the data connection between internet-based telephony system 20 and telephony device 30. If the data connection checked as act 10-5$_n$ is still viable, then as act 10-8$_n$ the HLR reclamation function 100 causes the location update request to be sent to home HLR 36 in a further attempt for the internet-based telephony system 20 to gain the visited network status.

Thus, the example embodiment of FIG. 12C illustrates that after the internet-based telephony system 20 receives a further indication (such as act 10-4$_2$) that the public land mobile network associated with the customer no longer considers the internet-based telephony system 20 as being the network visited by the telephony device associated with the customer, the HLR reclamation function 100 of intra-system roaming processor 60 imposes a time delay before again performing the acts of checking the data connection with the telephony device 30 (e.g., act 10-5$n$) and the act of sending a location update request to home HLR 36 (e.g., act 10-5$_n$). Moreover, the further indication may comprise plural further indications (e.g., such as act 10-4$_2$ and act 10-4$_3$) received either within a predetermined time period of one another. Alternatively, the n may comprise plural further indications (e.g., such as act 10-4$_2$ and act 10-4$_3$) received a predetermined time period of location update signals previously sent by the Internet Protocol telephony system (e.g., act 10-8$_2$ and act 10-8$_1$, respectively).

Figure 12D:
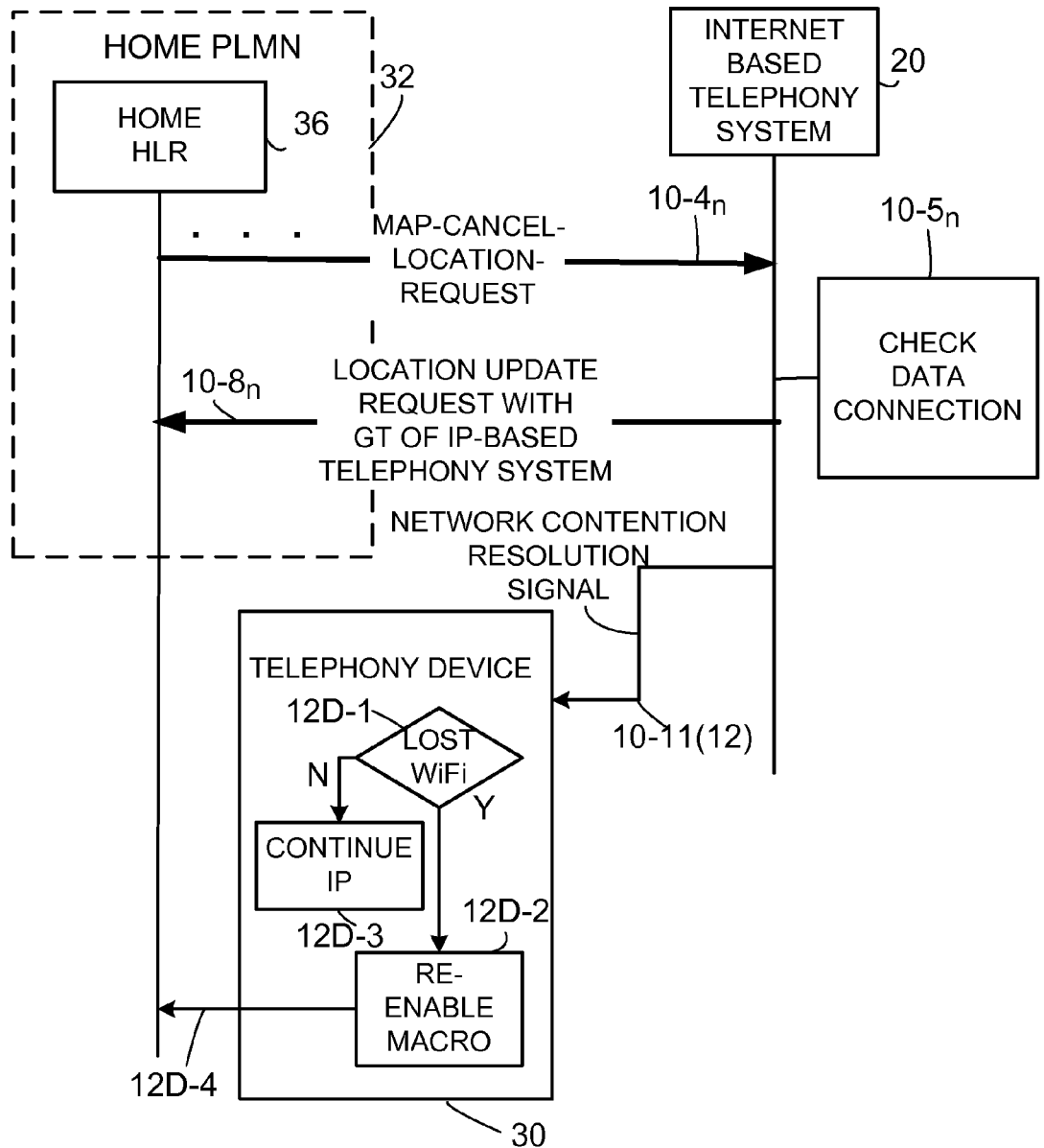

It has been described above, with reference to several scenarios, how a network contention resolution signal such as signal 10-11(12) may be generated and sent to telephony device 30 for the purpose of either automatically or under user control/selection disabling the macro communication capability/equipment of telephony device 30. FIG. 12D resembles portions of FIG. 12, but further illustrates that, at some point in time, the telephony device 30 may wish to re-enable or turn back on its macro communication capability/equipment. In particular, FIG. 12D shows that, as act 12D-1 the telephony device 30 (e.g., CoIP application 88 of telephony device 30) may make a determination that telephony device 30 has lost data connection with IP telephony service 20 or the quality of the data connection is no longer sufficient to provide adequate communications capabilities. In other words, act 12D-1 checks whether the telephony device 30 associated with the customer and the internet-based telephony system 20 are no longer in data communication (e.g., in WiFi coverage). As used herein, determination of a "data connection" and/or that the IP telephony service and the telephony device are in "data communication(s)" encompasses ascertaining that the quality of the connection/communication is acceptable for the intended transmission purpose. If data communication no longer exists between telephony device 30 and the internet-based telephony system 20, as act 12D-2 the telephony device 30 re-enables or macro communication capability/equipment of the telephony device 30 so that the telephony device 30 may gain access to the macro networks. As a result of such re-activation, should the telephony device 30 be within a cell of a macro network the macro network will eventually send a location update to the PLMN, e.g., to the HLR, as depicted by act 12D-3. On the other hand, should it be determined as act 12D-1 that the data connection with IP telephony system 20 is still viable, telephony device 30 continues operation with the macro communication capability/equipment still disabled 9 (as reflected by act 12D-4).

Thus the technology disclosed herein concerns a method of operating a telephony device, which method comprises at least temporarily disabling macro communication capability of the telephony device when the telephony device is in data communication with an IP telephony system (see, e.g., act 10-11(12)); and re-enabling the macro communication capability of the telephony device when the telephony device looses data communication with the IP telephony system (see, e.g., act 12D-1 and 12D-2). As also understood, e.g., from act 10-11(12), in an example implementation the method may further comprise providing a notification to the user of the telephony device to give the user an option of at least temporarily disabling the macro communication capability of the telephony device when the telephony device is in data communication with the IP telephony system.

Moreover, the technology disclosed herein concerns a telephony device comprising a processor (e.g., processor 102 of FIG. 16) configured to at least temporarily disable macro communication capability of the telephony device when the telephony device is in data communication with an IP telephony system; and re-enable the macro communication capability of the telephony device when the telephony device looses data communication with the IP telephony system.

The telephony device 30 may detect loss of data connection with internet-based telephony system 20 in several ways. For example, the CoIP application 88 of telephony device 30 may periodically send messages (e.g., "pings") to the IP telephony system 20 and, if acknowledgements are not received, determine that the telephony device 30 and IP telephony system 20 have lost data connection. Alternatively, as another example, the CoIP application 88 of telephony device 30 may perform a SIP registration with IP telephony system 20 server (providing the IP address of the telephony device 30) and, if an acknowledgement is not received, determine that the telephony device 30 and IP telephony system 20 have lost data connection. As understood from the foregoing, "lost data connection" may comprise a determination that the quality of the connection/communication is not acceptable for the intended transmission purpose.

Figure 15A:
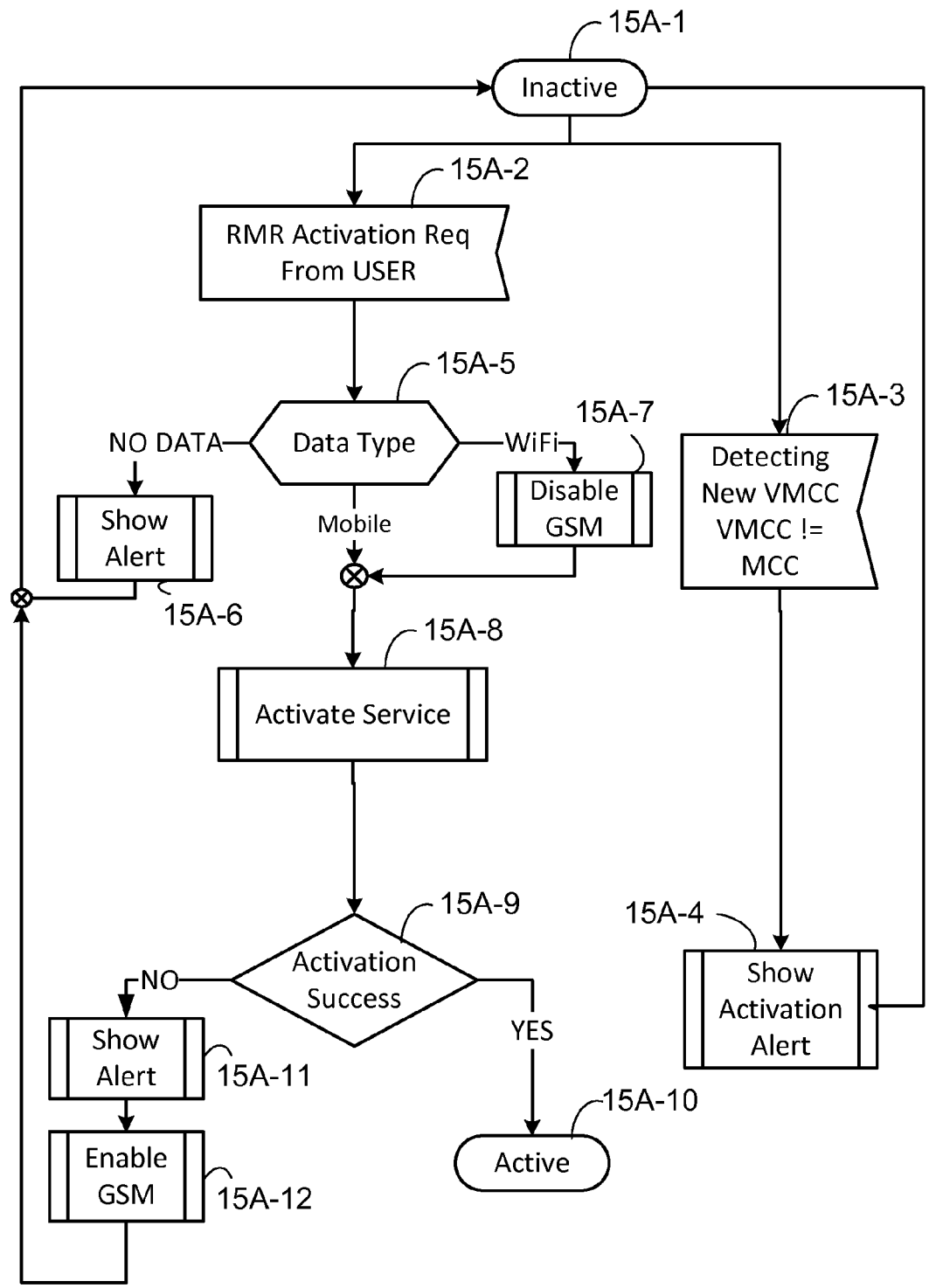
FIG. 15A-FIG. 15C are flowcharts showing example routines performed by an internet protocol telephony service according to an example embodiment and mode.
Figure 15B:
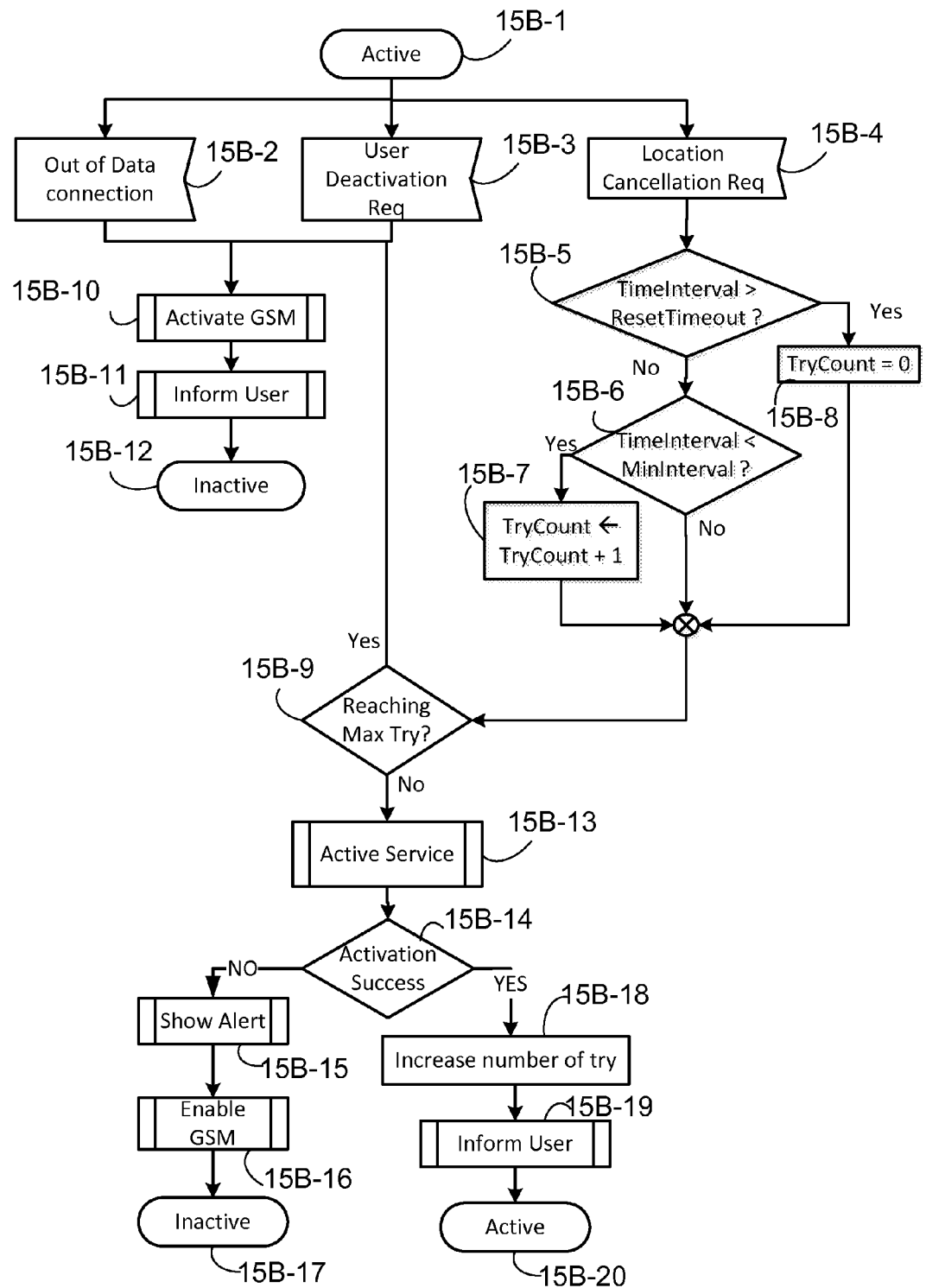
Figure 15C:
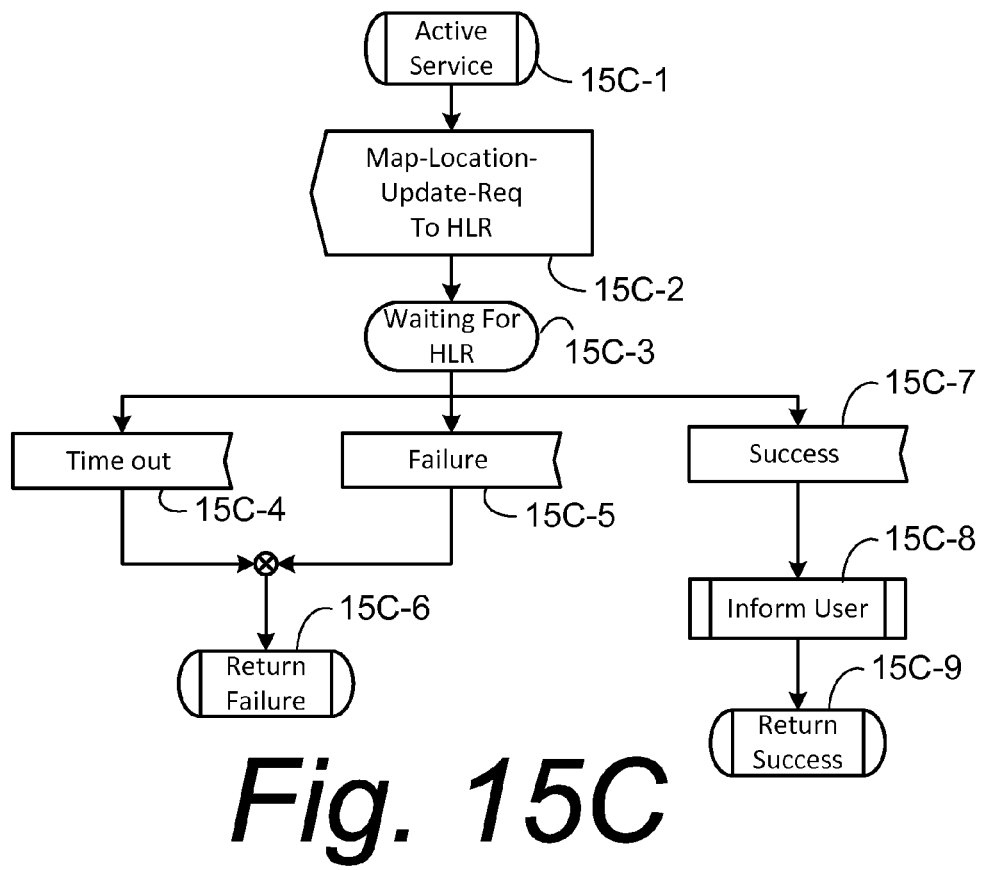

FIG. 15A, FIG. 15B, and FIG. 15C show example representative acts performed by intra-system roaming processor 60 of IP telephony system 20 in accordance with another example embodiment and mode. FIG. 15A illustrates example acts comprising a "Inactive" state routine; FIG. 15B illustrates example acts comprising an "Active" state routine; and FIG. 15C illustrates example acts comprising an "Active Service" state routine.

Act 15A-1 depicts a call or implementation of the Inactive state routine of FIG. 15A. When in the Inactive state the IP telephony system 20 determines whether a Reach Me Roaming (RMR) request is received from the telephony device as act 15A-2, or whether a new Visited mobile country code (VMCC) is detected as act 15A-3. If a new VMCC is detected, for the particular example illustrated implementation as act 15A-4 the HLR reclamation function 100 performs a Show Activation Alert routine. The Show Activation Alert routine essentially constantly checks the VMCC, and will generate an alarm when the VMCC is different than the mobile country code (MCC), thereby providing an indication to the user that the telephony device is in a roaming condition. If as act 15A-2 a Reach Me Roaming (RMR) request is received, as act 15A-5 a data type determination is made. If there is no data detected in act 15A-5, an alert process is performed (as depicted by act 15A-6) to notify the telephony device 30. If the data type is Wifi (meaning that the access is through an access point cell 48), a process (depicted by act 15A-7) is entered to disable the macro radio facilities (e.g., GSM antenna) of the telephony device before the Activate Service routine of FIG. 15C is executed (as depicted by act 15A-8). If the data type is determined at act 15A-5 to be mobile data (e.g., data connection through a macro cell), then the Activate Service state routine of FIG. 15C is directly entered (as depicted by act 15A-8).

As explained with reference to FIG. 15C, after its execution the Activate Service state routine returns either an indication of activation success or an indication of activation failure. Act 15A-9 comprises determining whether Activate Service state routine returns the indication of activation success or the indication of activation failure. If the determination of act 15A-9 is that an indication of activation success has been returned, the Active state routine is entered as depicted by act 15A-10. On the other hand, if the determination of act 15A-9 is that an indication of activation failure has been returned, act 15A-11 and act 15A-12 are performed. Act 15A-11 comprises sending an alert to telephony device 30 that the IP telephony system 20 cannot be utilized at that time. Act 15A-12 comprises execution of a process of sending communications to telephony device 30 to enable the telephony device 30 to use the macro cell data connection (e.g., macro radio resources such as GSM) rather than the data connection of IP telephony system 20. After execution of act 15A-4, act 15A-6, and act 15A-12, execution remains in the Inactive state as indicated by a return to act 15A-1.

Initiation or call of the Active state routine is depicted by act 15B-1 of FIG. 15B. In the Active state checks are made for three situations. A first such checked situation, depicted by act 15B-2, is that the telephony device 30 is without data connection, e.g., a WiFi connection. A second checked situation, depicted by act 15B-3, is that the user of telephony device 30 has sent a deactivation request to intentionally deactivate the service. A third checked situation, depicted by act 15B-4, is occurrence of a location update cancellation request.

As understood from the foregoing, receipt of a location update cancellation request means that another network, e.g., a macro network, has overridden the most recent attempt by internet-based telephony system 20 to be registered in the home HLR 36 as the visited network for telephony device 30. The internet-based telephony system 20 may be inclined to make yet another attempt to send a location area update request to again become the visited network. But the internet-based telephony system 20 may be conscious that it has wrestled numerous times with other network(s) to become the visited network registered in the home HLR 36, and may now become suspicious or weary of such efforts. To this end, internet-based telephony system 20 may have a predetermined parameter "MaxTry" which corresponds to a maximum number of location area update "wrestling" or "try" attempts in which the internet-based telephony system 20 is permitted to engage in a predetermined time interval.

In the above regard, as act 15B-5 a check is made whether the predetermined time interval has been reached, e.g., whether a clocked parameter TimeInterval exceeds a predetermined limit (ResetTimeout). If the predetermined time interval has not been reached reached, as act 15B-6 a further check is performed to ensure that the value of the clocked parameter TimeInterval exceeds a minimum time interval (MinInterval). If the minimum time interval (MinInterval) is exceeded as determined by act 15B-6, as act 15B-7 a counter "TryCount", which corresponds to the number of "wrestling" or "try" attempts during the predetermined time interval, is increment in view of the location cancellation request received as act 15B-4. If the check of act 15B-5 indicates that the predetermined time interval has been reached, as act 15B-8 the counter "TryCount" is reinitialized at zero. After either reinitialization of the counter "TryCount" as act 15B-8 or the incrementation of the counter "TryCount" as act 15B-7, act 15B-9 is performed.

Regarding various parameters just mentioned, MinInterval may be the minimum time interval between receiving 'Location Cancellation' that will not affect user's TryCount. ResetTimeout may be the minimum time interval between receiving 'Location Cancellation' that will reset the user's TryCount. ResetTimeout and MinInterval are set by the IP telephony service provider (operator). The setting of values ResetTimeout and MinInterval may be based on 'Signaling link cost' or ' Average usage of service by user'. Moreover, these values may be set the same for all users or on a per user basis. In an example implementation it is possible to try to keep user in the network (under cover of the IP telephony system) by setting 'ResetTimeout' Low and 'MinInterval' high should the user have too much incoming call (the user with higher average revenue per user [ARPU]). A user with TryCount=0 can receive maximum try to stay in the IP telephony network (by resending 'location update request' to related GSM operator). But if a user's TryCount is more than MaxTry, the IP telephony will stop trying to keep the user under its coverage and user will yield to the macro network, e.g., allow the GSM network to become the visited network.

As act 15B-9 a check is made if the number of location area update attempts by internet-based telephony system 20 has reached the "MaxTry" limit. That is, as act 15B-9 a check is made whether the intra-system roaming processor 60 has reached a maximum permitted number of location update attempts, e.g., a maximum number of unsuccessful attempts to register the IP telephony system 20 as the visited network for telephony device 30.

Upon occurrence of any one of the lack of data connection (act 15B-2), the user deactivation request (act 15B-3), or reaching the maximum number of location update attempts (act 15B-9), act 15B-10 through act 15B-12 are performed. Act 15B-10 comprises a process of enabling the telephony device 30 to activate the macro radio communication capabilities (e.g., activate GSM). Act 15B-11 comprises a process for notifying the user of telephony device 30 that the macro radio communication capabilities have been activated. Act 15B-12 depicts a return to the Inactive state process of FIG. 15A.

If a maximum permitted number of location update attempts have not been reached at act 15B-9, the Active Service state routine is called as depicted by act 15B-13. As mentioned above, after its execution the Active Service state routine returns either an indication of activation success or an indication of activation failure. Act 15B-14 comprises determining whether the Activate Service state routine returns the indication of activation success or the indication of activation failure.

If the determination of act 15B-14 is that an indication of activation failure has been returned from the Active service state process, act 15B-15 through act 15A-17 are performed. Act 15B-15 comprises performing a process to provide an alert to the user of telephony device 30 that the location update attempt for IP telephony system 20 was a failure. Act 15B-16 comprises performing a process to enable the macro radio communication capabilities of telephony device 30. Act 15B-19 comprises returning to the Inactive state process of FIG. 15A.

If the determination of act 15B-14 is that an indication of activation success has been returned, acts such as act 15B-18 through act 15B-20 are performed. Act 15B-18 comprises incrementing or increasing a counter that keeps tally of the number of tries or number of attempts to perform a location update to register the IP telephony system 20 as the visited network. Act 15B-19 comprises performing a process for notifying or informing the user of telephony device 30 that the location update for the IP telephony system 20 has been successful. Act 15B-20 comprises a return to the Active state process, e.g., a return to act 15B-1.

Initiation or call of the Active Service state routine is depicted by act 15C-1 of FIG. 15C. In the Active Service state as act 15C-2 the intra-system roaming processor 60 attempts a location update request to specify the IP telephony system 20 as the visited network. The location update request may take the form of a Map-Location-Update-Request message to the HLR of the telephony device 30. After making the location update request of act 15C-2, the telephony system 20 waits for a response from the HLR as depicted by act 15C-3. There are three potential further acts depend upon whether the HLR responds to the Map_Location_Update-Request and the nature of the HLR response. If there is no HLR response after a time out interval (depicted by act 15C-4) or if the HLR response indicates that the location update request was a failure (depicted by act 15C-5), as act 15C-6 the Active Service state routine returns a failure indication. On the other hand, if the HLR response indicates that the location update request was a success (depicted by act 15C-7), the telephony system 20 informs the user of telephony device 30 (as shown by act 15C-8) and then returns a success indication as depicted by act 15C-9.

Figure 16:
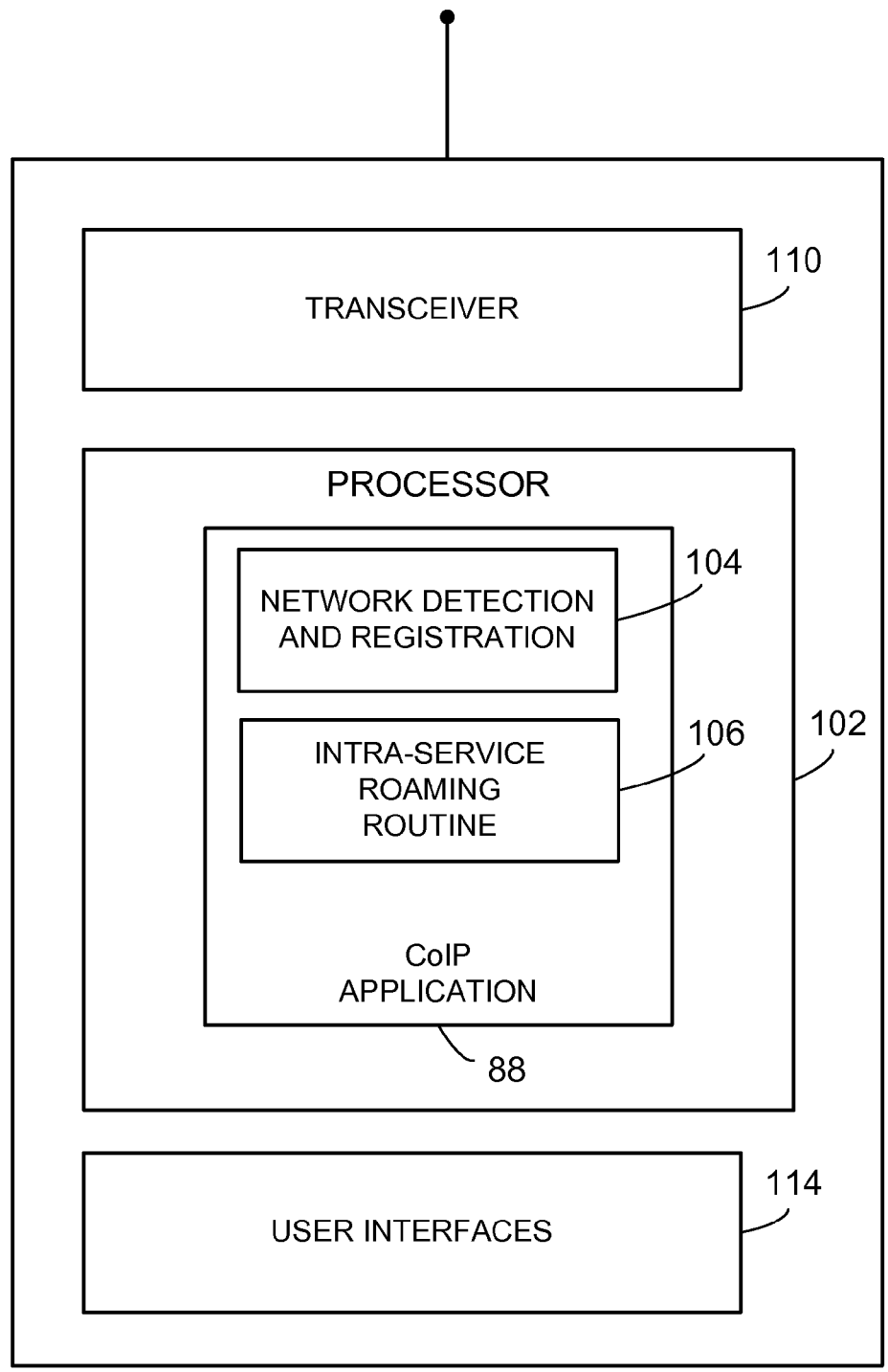
FIG. 16 is a schematic view of a wireless or mobile telephony device for which roaming is facilitated by an Internet-based telephony system which facilitates intra-system roaming.

FIG. 16 shows example, non-limiting functionalities and/or units of a wireless telephony device 30 according to an exemplary embodiment. The telephony device 30 includes IP telephony application 88 which is executed by one or more processor(s) 102. The IP telephony application 88 comprises several routines and functionalities, including network access detection and registration routine 104 described herein. As understood by those skilled in the art, processor(s) 102 may execute other applications as well, including those not specific to internet-based telephony system 20.

In addition, telephony device 30 comprises one or more transceivers 110, which may communicate wirelessly (e.g., across a radio or air interface) to send and receive communications. Using differing communication resources and by virtue of one or more antenna, the transceiver 110 may communicate with radio access network(s) (RANs) 42 with wireless internet-connected access points 50. The telephony device 30 also comprises various user interfaces 114, such as touchscreen, keypad, microphone, speaker, etc.

The network access detection and registration routine 104 is configured to comprise logic to facilitate and/or participate in the signaling described herein such as that of FIG. 6 through FIG. 10, for example. Coded instructions comprising network access detection and registration routine 104 may be stored on computer-readable non-transitory media. As such, the network access detection and registration routine 104 may comprise a computer program product.

Figure 17:
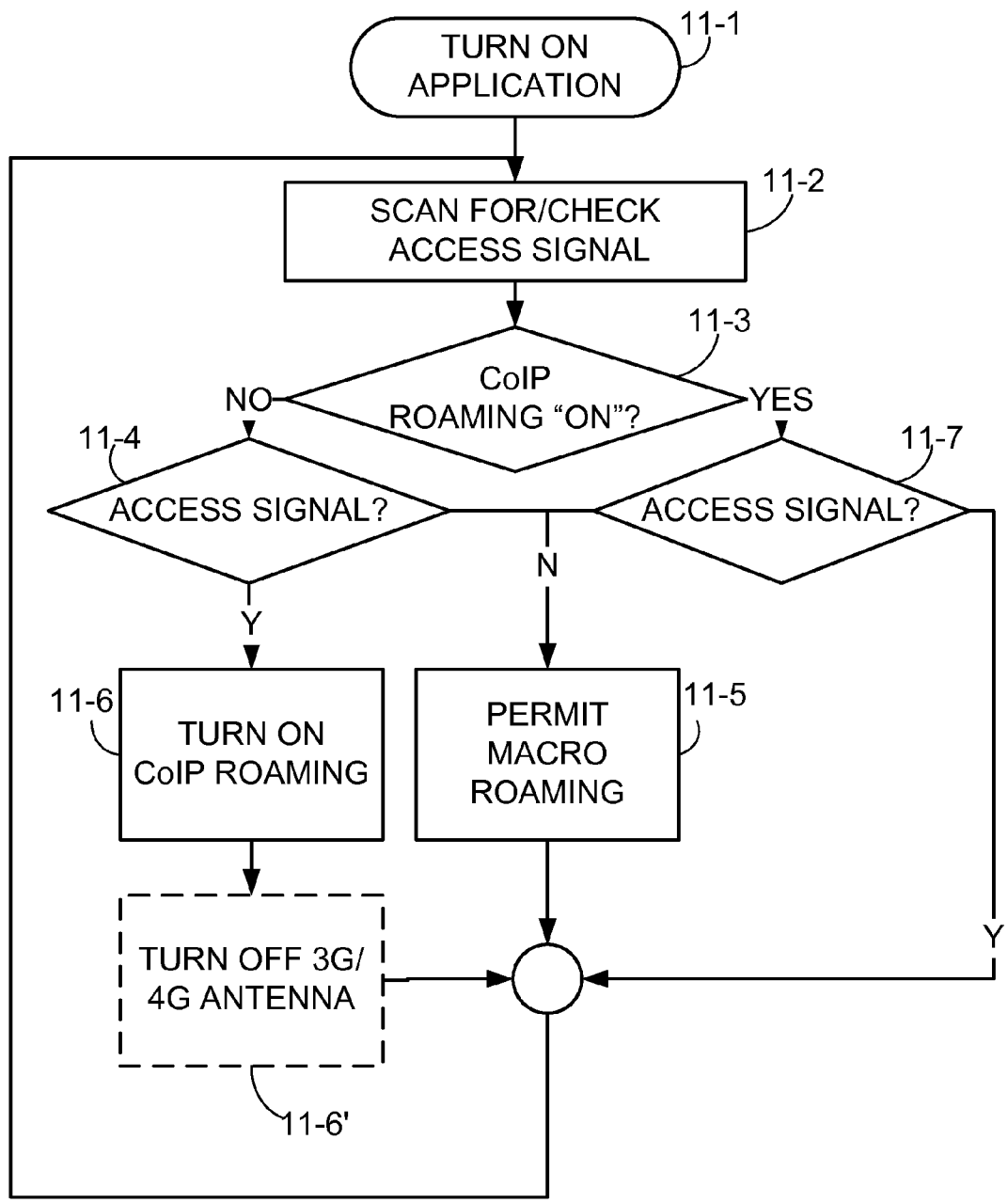
FIG. 17 is a flowchart showing exemplary basic acts or steps performed upon execution at a telephony device of a network access detection and registration routine according to an exemplary embodiment and mode.

Exemplary representative acts or steps performed upon execution by processor(s) 102 of the network access detection and registration routine 104 are shown in FIG. 17. Act A-1 reflects turn on or initiation of network access detection and registration routine 104. Act A-2 involves network access detection and registration routine 104, or transceivers 110 at the request of network access detection and registration routine 104, scanning for and checking whether telephony device 30 has or can obtain a signal to/with an internet-connected wireless access service, such as a WiFi or WiMAX access service or a broadcast signal (PBCCH) from a macro cell 46 which identifies the macro cell has having data-connection handling (e.g., GPRS) capability, for example.

Act A-3 comprises checking whether an intra-service roaming feature (the CoIP roaming feature) is currently activated. If it is determined as act A-3 that the intra-service roaming feature is not already activated, a decision is made as act A-4 whether the signal of the internet-connected wireless access service was detected at act A-2. Such "detection" may comprise, e.g., checking to ensure that there is a threshold level of wireless connectivity before implementing roaming. If the signal of the internet-connected wireless access service was not detected, then the CoIP roaming feature still cannot be used and the telephony device 30 is relegated or permitted to use of the macro radio access networks. That is, any roaming capabilities of the telephony device 30 are the roaming capabilities afforded by the GSM-type radio access networks, as reflected by act A-5 of FIG. 17.

On the other hand, act A-6 shows that the intra-service roaming feature, although not now activated, can be activated if the signal of the internet-connected wireless access service is detected. Activating the intra-service roaming feature, e.g., the CoIP roaming, comprises the telephony device 30 and particularly network access detection and registration routine 104 sending and receiving signals such as those illustrated and described for telephony device 30 with reference to FIG. 6 through and including FIG. 8.

As an optional act A-6', the network access detection and registration routine 104 may turn off any antenna (e.g., 3G and/or 4G antenna) that would be used to send a location update message to any radio access network operator, e.g., to any network other than internet-based telephony system 20.

After the intra-service roaming feature is activated, the intra-service roaming feature stays activated until turned off by the user (e.g., de-activation of network access detection and registration routine 104) or until, after a return to act A-2, it is determined that the signal of the internet-connected wireless access service is no longer or not detected.

If it is determined as act A-3 that the intra-service roaming feature is already activated, a decision is made as act A-7 whether the signal of the internet-connected wireless access service was detected at act A-2. If the signal of the internet-connected wireless access service was not detected, then the CoIP roaming feature can no longer be used and the telephony device 30 may permit use of the macro radio access networks, as already discussed with reference to act A-5 of FIG. 17.

On the other hand, if while the intra-service roaming feature is already activated and the signal of an internet-connected wireless access service still detected, the intra-service roaming feature stays activated. A check may be made, however, as act A-8, that the telephony device 30 is still connected to the same access point 50. This check may be performed by internet-based telephony system 20 on a periodic basis, or by the CoIP application 88. If the check of act A-7 is positive, the telephony device 30 continues its CoIP roaming within telephony system 20, either through the same or a different access point 50. Thus, upon a positive determination of act A-7 execution of network access detection and registration routine 104 loops back to act A-2 to continue to monitor for a signal of an internet-connected wireless access service.

Figure 18:
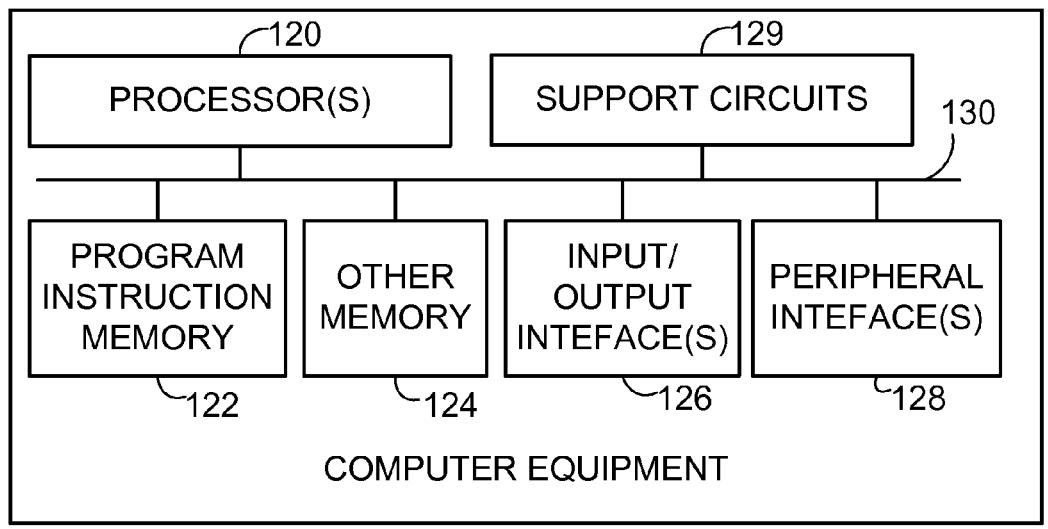
FIG. 18 is a schematic view shows an example of machine hardware comprising one or more processors for implementing aspects of an IP telephony system and a telephony device according to exemplary embodiments.

Various functions described herein, including functions of intra-system roaming processor 60 of internet-based telephony system 20 and IP telephony application 88 (including network access detection and registration routine 104) of telephony device 30, may, at least in some embodiments and modes, be performed by machine hardware. FIG. 18 shows an example of such machine hardware as comprising one or more processors 120, program instruction memory 122; other memory 124 (e.g., RAM, cache, etc.); input/output interfaces 126; peripheral interfaces 128; support circuits 129; and busses 130 for communication between the aforementioned units.

The memory 124, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 129 are coupled to the processors 120 for supporting the processor in a conventional manner. These circuits include cache, power supplies, clock circuits, input/output circuitry and subsystems, and the like.

Software routines such as software for intra-system roaming or CoIP roaming of telephony system 20 and the software (e.g., IP telephony application 88 and its network access detection and registration routine 104) for the telephony device 30 are executed by processor(s) 60 of the internet-based telephony system 20 and processor(s) 102 of telephony device 30, respectively. For the machine hardware of each intra-system roaming processor 60 and telephony device 30 such software may be stored on non-transient memory such as program instruction memory 122. Also, the software routines could also be stored remotely from the CPU, e.g., remotely from processors 120. For example, the software could be resident on servers and memory devices that are located remotely from the CPU, but which are accessible to the CPU via a data network connection. Such software, when executed by processors 120, transforms the general purpose computer into a specific purpose computer that performs one or more functions of the IP telephony system 20. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The technology disclosed herein has many advantages. A non-exhaustive listing of such advantages includes:

Reducing the roaming costs of a subscriber/customer by increasing utilization of internet-based telephony system 20. Such advantage is enhanced by an automatic switch to internet-based telephony system 20 as soon as coverage from an internet-connected access point is detected and connected thereto made.

Simplification of roaming implementation, in many cases without subscriber/customer interaction. For example, the CoIP roaming may be implemented without a customer/subscriber having to use of even see a "Call-Forward" or "Roam" icon on telephony device 30.

Maximum reachability of a subscriber/customer through internet-based telephony system 20, as facilitated by an automatic switch between CoIP roaming and GSM-type roaming.

Minimizing subscriber/customer dependence on radio access network (e.g., GSM type) operators.

Avoiding use of any permanent or fixed access number for a telephony device.

Forwarding any type of internet-transmissible communications to the telephony device, including but not limited to voice and short message service (SMS) communications.

Affording network or service operators an opportunity to improve coverage.

In the above regard, an operator which generally transmits communications without use of a data connection may enhance its service and/or coverage if provided with ability to use a data connection. For example, when a user is at home and his telephony device 30 has a data connection (e.g., to Internet 24), the operator can send all of the user's communications to his telephony device 30 via the data connection. Moreover, in case the operator has a coverage problem in some area, the operator can still use the technology disclosed herein and send communications through the data network to deliver a high quality service to the subscriber.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating an internet-based telephony system comprising:
    (1) the internet-based telephony system determining that a telephony device associated with a customer of the internet-based telephony system has access to service of the internet-based telephony system;
    (2) the internet-based telephony system sending a first location update signal to a public land mobile network associated with the customer, the first location update signal including an identification of the internet-based telephony system as a network visited by the telephony device associated with the customer; and thereafter
    (3) the internet-based telephony system receiving an indication that the public land mobile network associated with the customer no longer considers the internet-based telephony system as being the network visited by the telephony device associated with the customer; then
    (4) the internet-based telephony system determining the telephony device associated with the customer and the internet-based telephony system are still in data communication at a time when the internet-based telephony system is not considered the network visited by the telephony device associated with the customer, and then
    (5) the internet-based telephony system sending a second location update signal to the public land mobile network associated with the customer to register the internet-based telephony system as the network visited by the telephony device associated with the customer.

2. The method of claim 1, wherein the indication that the public land mobile network associated with the customer no longer considers the internet-based telephony system as being the network visited by the telephony device associated with the customer comprises a map-cancel-location-request signal.

3. The method of claim 1, wherein when a set of act (3), act (4), and act (5) occurs a predetermined number of times, sending a network contention resolution signal to the telephony device, the network contention resolution signal being configured to either:
    (1) disable macro communication capability of the telephony device; or
    (2) provide a notification to the telephony device.

4. The method of claim 1, further comprising:
    determining that the telephony device is not participating in a service provided through a macro radio network;
    sending a signal to disable macro communication capability of the telephony device so that the IP telephony system remains as the network visited by the telephony device associated with the customer.

5. The method of claim 4, wherein determining that the telephony device is not participating in the service provided through the macro radio network comprises receiving an indication from the telephony device that the telephony device is not participating in the service provided through the macro radio network.

6. The method of claim 1, further comprising:
    sending a signal to disable macro communication capability of the telephony device so that the IP telephony system remains as the network visited by the telephony device associated with the customer; and then
    determining that the telephony device associated with the customer and the internet-based telephony system are no longer in data communication.

7. The method of claim 1, wherein determining that the telephony device associated with the customer and the internet-based telephony system are in data communication comprises determining that a still-alive indication associated with the telephony device exists in a status database.

8. The method of claim 7, further comprising the internet-based telephony system sending a prompt message to the telephony device and, upon receipt of a response to the prompt message, setting the data connection still-alive indication in the status database.

9. The method of claim 1, wherein act (3), act (4), and act (5) comprise a set of acts that may be repeated for plural iterations, and wherein after act (5) has been performed a maximum number of times the act (4) and the act (5) are not performed for a next iteration.

10. The method of claim 1, further comprising, after the internet-based telephony system receives a further indication that the public land mobile network associated with the customer no longer considers the internet-based telephony system as being the network visited by the telephony device associated with the customer, imposing a time delay before again performing act (4) and act (5).

11. The method of claim 10, wherein the further indication comprises plural further indications received either within a predetermined time period of one another or within a predetermined time period of location update signals previously sent by the Internet Protocol telephony system.

12. An internet-based telephony system comprising a processor of the internet-based telephony system configured to:
    (1) determine that a telephony device associated with a customer of the internet-based telephony system has access to service of the internet-based telephony system;
    (2) send a first location update signal to a public land mobile network associated with the customer, the first location update signal including an identification of the internet-based telephony system as a network visited by the telephony device associated with the customer; and thereafter
    (3) receive an indication that the public land mobile network associated with the customer no longer considers the internet-based telephony system as being the network visited by the telephony device associated with the customer; then (4) determine that the telephony device associated with the customer and the internet-based telephony system are still in data communication at a time when the internet-based telephony system is not considered the network visited by the telephony device associated with the customer; and then (5) send a second location update signal to the public land mobile network associated with the customer to register the internet-based telephony system as the network visited by the telephony device associated with the customer.

13. The system of claim 12, wherein the indication that the public land mobile network associated with the customer no longer considers the internet-based telephony system as being the network visited by the telephony device associated with the customer comprises a map-cancel-location-request signal.

14. The system of claim 12, wherein when a set of act (3), act (4), and act (5) occur a predetermined number of times, the processor is configured to send a network contention resolution signal to the telephony device, the network contention resolution signal being configured to either:
disable macro communication capability of the telephony device; or
provide a notification to the telephony device.

15. The system of claim 12, wherein the processor is further configured to:
determine that the telephony device is not participating in a service provided through a macro radio network; and
send a signal to the telephony device to disable macro communication capability of the telephony device.

16. The system of claim 15, wherein the processor is configured to determine that the telephony device is not participating in the service provided through the macro radio network by receiving an indication from the telephony device that the telephony device is not participating in the service provided through the macro radio network.

17. The system of claim 12, wherein the processor is further configured to:
send a signal to disable macro communication capability of the telephony device so that the IP telephony system remains as the network visited by the telephony device associated with the customer; and then
determine that the telephony device associated with the customer and the internet-based telephony system are no longer in data communication.

18. The system of claim 12, wherein the processor is configured to determine whether the telephony device associated with the customer and the internet-based telephony system are in data communication by making a determination that a still-alive indication associated with the telephony device still exists in a status database.

19. The system of claim 18, wherein the processor is further configured to send a prompt message to the telephony device and, upon receipt of a response to the prompt message, to set the data connection still-alive indication in the status database.

20. The system of claim 12, wherein act (3), act (4), and act (5) comprise a set of acts that may be repeated for plural iterations, and wherein the processor is configured so that after act (5) has been performed a maximum number of times the act (4) and the act (5) are not performed for a next iteration.

21. The system of claim 12, wherein the processor is further configured, after the internet-based telephony system receives a further indication that the public land mobile network associated with the customer no longer considers the internet-based telephony system as being the network visited by the telephony device associated with the customer, to impose a time delay before again performing act (4) and act (5).

22. The system of claim 21, wherein the further indication comprises plural further indications received either within a predetermined time period of one another or within a predetermined time period of location update signals previously sent by the Internet Protocol telephony system.

23. The method of claim 1, wherein in acts (2 and (5) the Internet-based telephony system sends to the public land mobile network associated with the customer a location update request with a Global Title of the Internet-based telephony system as an indication of current location of the telephony device.

24. The system of claim 12, wherein the processor is further configured to send to the public land mobile network associated with the customer a location update request with a Global Title of the Internet-based telephony system as an indication of current location of the telephony device.

25. The method of claim 1, wherein:
act (1) comprises the internet-based telephony system determining that the telephony device associated with the customer of the internet-based telephony system has WiFi or WiMax access to service of the internet-based telephony system;
act (2) comprises the internet-based telephony system sending the first location update signal to a public land mobile network associated with the customer to register the internet-based telephony system as a visited network which is visited by the telephony device associated with the customer;
act (3) comprises the internet-based telephony system receiving an indication from the public land mobile network associated with the customer that the internet-based telephony system is no longer registered as the network visited by the telephony device associated with the customer; and
act (4) comprises the internet-based telephony system determining the telephony device associated with the customer and the internet-based telephony system are still in WiFi or WiMax communication at the time when the internet-based telephony system is not registered as the network visited by the telephony device associated with the customer.

* * * * *